(12) United States Patent
Olderdissen

(10) Patent No.: US 10,467,115 B1
(45) Date of Patent: Nov. 5, 2019

(54) DATA CONSISTENCY MANAGEMENT IN LARGE COMPUTING CLUSTERS

(71) Applicant: Nutanix, Inc., San Jose, CA (US)

(72) Inventor: Jan Ralf Alexander Olderdissen, Herrenberg (DE)

(73) Assignee: Nutanix, Inc., San Jose, CA (US)

( * ) Notice: Subject to any disclaimer, the term of this patent is extended or adjusted under 35 U.S.C. 154(b) by 118 days.

(21) Appl. No.: 15/803,085

(22) Filed: Nov. 3, 2017

(51) Int. Cl.
| | |
|---|---|
| G06F 11/00 | (2006.01) |
| G06F 11/30 | (2006.01) |
| G06F 11/07 | (2006.01) |
| G06F 16/23 | (2019.01) |
| G06F 11/20 | (2006.01) |
| G06F 11/14 | (2006.01) |

(52) U.S. Cl.
CPC ...... G06F 11/3034 (2013.01); G06F 11/0793 (2013.01); G06F 16/2365 (2019.01); *G06F 11/1458* (2013.01); *G06F 11/2082* (2013.01); *G06F 2201/82* (2013.01)

(58) Field of Classification Search
CPC combination set(s) only.
See application file for complete search history.

(56) References Cited

U.S. PATENT DOCUMENTS

| | | | |
|---|---|---|---|
| 6,516,425 B1 * | 2/2003 | Belhadj | G06F 11/1092 714/15 |
| 7,000,141 B1 * | 2/2006 | Karlsson | G06F 9/5011 709/201 |
| 8,185,784 B2 * | 5/2012 | McCombs | G06F 11/004 714/47.2 |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,880,801 B1 * | 11/2014 | Robins | G06F 12/0246 711/114 |
| 8,997,097 B1 | 3/2015 | Aron et al. | |
| 9,003,086 B1 * | 4/2015 | Schuller | G06F 3/0613 710/62 |
| 9,052,936 B1 | 6/2015 | Aron et al. | |

(Continued)

OTHER PUBLICATIONS

Wikipedia. "RAID". Oct. 6, 2017. 14 pages.
(Continued)

*Primary Examiner* — Amine Riad
(74) *Attorney, Agent, or Firm* — Vista IP Law Group, LLP

(57) ABSTRACT

Storage device groups are formed with respect to data consistency policies and/or quantified probabilities. A method embodiment commences upon identifying a computing system having a plurality of storage devices that are accessed by a plurality of computing nodes. A user interface serves for collecting policies, data loss parameters, and data rebuild parameters. Based on the policies and/or values of the data loss parameters, and values of the data rebuild parameters, sets of storage device groups are formed to achieve particular data loss and rebuild time properties. Data storage containers such as files or virtual disks that hold persistent datasets are assigned to respective storage device groups that are appropriate to the nature of the dataset. The objective pertaining to an acceptable likelihood of data loss as well as the objective of an acceptable time for rebuild are achieved as a result of assignments of certain storage devices into a group.

20 Claims, 21 Drawing Sheets

(56) References Cited

U.S. PATENT DOCUMENTS

| | | | |
|---|---|---|---|
| 9,189,309 B1* | 11/2015 | Ma | G06F 11/3034 |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,772,866 B1 | 9/2017 | Aron et al. | |
| 9,774,680 B2* | 9/2017 | Vas | H04L 67/1097 |
| 10,073,639 B1* | 9/2018 | Auvenshine | G06F 11/1076 |
| 2005/0015653 A1* | 1/2005 | Hajji | G06F 11/1092 714/6.2 |
| 2007/0050543 A1* | 3/2007 | Pomerantz | G06F 3/0605 711/114 |
| 2009/0157991 A1* | 6/2009 | Rajan | G06F 11/008 711/162 |
| 2010/0122115 A1* | 5/2010 | Olster | G06F 11/004 714/6.32 |
| 2010/0274762 A1* | 10/2010 | Murphy | G06F 11/1446 707/636 |
| 2012/0278578 A1* | 11/2012 | Castillo | G06F 12/02 711/165 |
| 2013/0031425 A1* | 1/2013 | Vingralek | G06F 11/008 714/47.3 |
| 2013/0239361 A1* | 9/2013 | Pellenc | A01G 20/47 15/405 |
| 2015/0026517 A1* | 1/2015 | Ben Romdhane | G06F 11/1458 714/15 |
| 2017/0331287 A1* | 11/2017 | Kopp | G06Q 10/06312 |
| 2019/0155698 A1* | 5/2019 | Shekhar | G06F 11/1469 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

DATA CONSISTENCY MANAGEMENT IN LARGE COMPUTING CLUSTERS

FIELD

This disclosure relates to high-availability data storage in distributed computing environments, and more particularly to techniques for data consistency management in large computing clusters.

BACKGROUND

Enterprises are inexorably demanding more and more flexibility in scaling and configuring and their computing systems. Modern distributed computing systems have evolved to facilitate such flexibility by natively coordinating distributed compute, storage, networking, and/or other distributed resources in such a way that incremental scaling of computing capabilities can be accomplished in any or all of the aforementioned dimensions of computing capabilities, storage capabilities, and networking capabilities.

As an example of scaling computing resources, some clusters in an enterprise's distributed computing system might comprise multiple nodes that support numerous autonomous virtualized entities (e.g., virtual machines, executable containers, etc.) that are deployed across a large number of nodes so as to perform assigned parallelizable computing tasks. In many cases, a large number of virtualized entities (VEs) might be launched (e.g., in a swarm) across a large number of nodes, where each node performs some subset of the computing tasks. As an example of scaling storage capabilities, modern distributed storage resources comprise aggregations of physical storage devices (e.g., disks) that are organized into a logical storage area throughout which data may be distributed according to various metrics and/or partitioning. In particular, data may be distributed across many nodes and/or disks in the distributed computing system. In addition to the aforementioned distribution across nodes, the data might be replicated any number of times onto any number of disks so as to achieve high availability of the stored data (e.g., data consistency) even in the event of a node or disk failure. Increasing the number of times a data item is replicated tends to decrease the likelihood of data loss, so a naïve approach might be to add nodes or disks to support more replicas.

Unfortunately, increasing the number of nodes or disks in a cluster increases the likelihood of a disk failure in any given time period (i.e., since there are more nodes or disks that are susceptible to failure). As the number of nodes in a cluster increases, so does the number of disks in the cluster that store any particular dataset and its replicas. This increase in the number of nodes in a cluster in turn increases the probability that a failure at any one of those disks will occur before an earlier disk failure is remedied. As an example, with a replication factor (RF) of two (e.g., a dataset and one replica of the dataset), if a first disk storing a storage extent fails, and a second disk storing a replica of the storage extent also fails before the content of the first disk is rebuilt, the data comprising the storage extent will be lost. At the same time, one can observe that as the time to perform a rebuild becomes longer, such as due to storage I/O congestion when the data distribution is across fewer disks, the likelihood of a second failure increases merely due to the passage of time. Thus, on one hand, distribution of data to more disks might lead to reduced rebuild times (e.g., since there is less storage I/O congestion), whereas distribution to fewer disks might lead to a reduced likelihood of disk failure in a given time period (e.g., since disk drive failure rates are cumulative).

One legacy approach to addressing such data loss challenges is to place a limit on the number of nodes or disks in a cluster. However, this places a burden on the system administrators of large enterprises as their distributed systems scale (e.g., since the system administrators might then have to manage more and more clusters as separate entities). Further, as storage technologies continue to advance, the number of disks assigned to a given node also continues to increase, which increases the likelihood of disk drive data loss even with a constraint on the number of nodes in a given cluster.

Another legacy approach increases the replication factor to mitigate the increased probability of data loss in a growing cluster (e.g., due to use of more disks that could fail and cause a loss of data). This approach, however, is implemented at a substantial additional cost. For example, to increase the replication factor from "RF=2" to "RF=3", approximately 50% more computing, storage, and networking resources would need to be deployed to manage the additional data replication. What is needed is a technological solution to relieve artificial constraints on the number of nodes in a cluster while still maintaining an acceptably low likelihood of data loss in a given time period.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by their inclusion in this section.

SUMMARY

The present disclosure describes techniques used in systems, methods, and in computer program products for data consistency management in large computing clusters, which techniques advance the relevant technologies to address technological issues with legacy approaches. More specifically, the present disclosure describes techniques used in systems, methods, and in computer program products for achieving cluster-wide data loss protection while achieving acceptable data restoration performance in large-scale distributed computing clusters. Certain embodiments are directed to technological solutions for implementing a multi-objective storage device grouping technique to form groups of storage devices in a cluster that store respective datasets and their replicas to achieve data loss objectives in large clusters.

The disclosed embodiments modify and improve over legacy approaches. In particular, the herein-disclosed techniques provide technical solutions that address the technical problems attendant to maximizing the number of nodes in a cluster while maintaining an acceptable likelihood of data loss. Such technical solutions relate to improvements in computer functionality. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to high performance computing.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
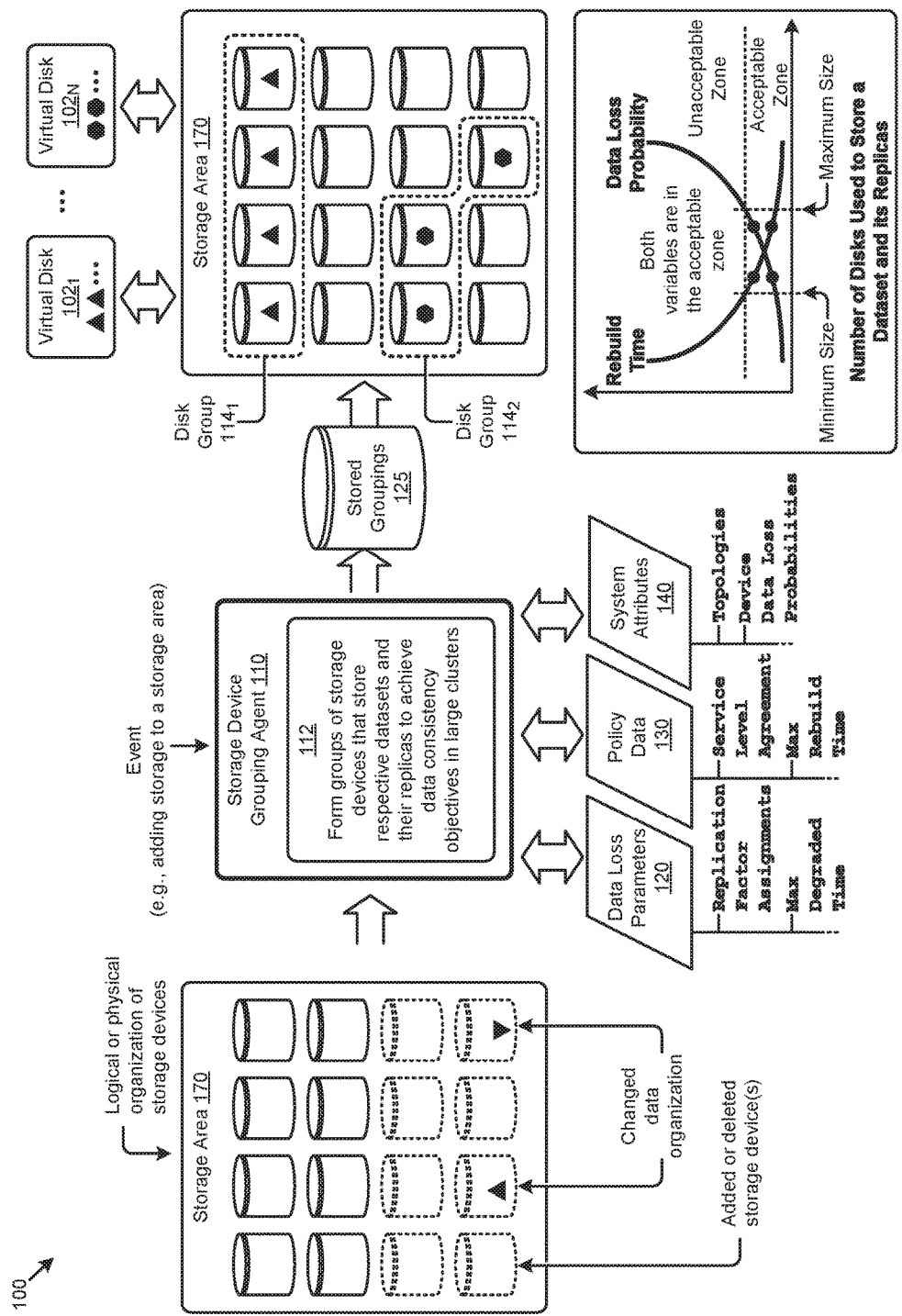
FIG. 1 illustrates a distributed computing environment in which embodiments of the present disclosure can be implemented.

Embodiments in accordance with the present disclosure address the problem of allowing for a continuously increasing number of nodes in a cluster while maintaining an acceptably low likelihood of data loss. Some embodiments are directed to approaches for implementing a multi-objective grouping technique to form groups of storage devices in a cluster that store respective datasets and their replicas to achieve data consistency objectives in large clusters. The accompanying figures and discussions herein present example environments, systems, methods, and computer program products for achieving cluster-wide data loss protection while achieving acceptable data restoration performance in large-scale distributed computing clusters.

Overview

Users of distributed systems have a data consistency expectation (e.g., "strictly consistent") of a distributed computing platform to provide consistent and predictable storage behavior (e.g., availability, accuracy, etc.) for data and/or metadata. Distributed computing platform providers can address such expectations by implementing a replication policy to facilitate data redundancy and/or availability in case of a node failure and/or a disk failure. For example, a given replication policy might be described at least in part by a numeric replication factor (RF) such as "RF=2", indicating that two replicas of certain data (e.g., metadata, user data, etc.) may be distributed among various available disks in the cluster. Such replication policies (e.g., replicating data across multiple nodes) serve to reduce the probability of data loss by managing hardware remediation and data recovery after detection of a first failure event in a cluster.

However, as the scale of an enterprise's distributed computing and storage system increases, so does the complexity of managing certain aspects of the system. For example, a system administrator might be responsible for cluster management (e.g., deployment, maintenance, scaling, etc.), VE management (e.g., creation, placement, protection, migration, etc.), storage management (e.g., allocation, policy compliance, location, etc.), and/or management of other aspects of the infrastructure. In some cases, a system administrator or an administrative team for a large enterprise might have numerous clusters to manage. These administrators often desire to minimize the number of clusters under individual management by increasing the average number of nodes in a given cluster. Minimization of the number of clusters facilitates, for example, an increased capacity and/or flexibility pertaining to intra-cluster operations (e.g., storage allocation, VE migration, etc.), a reduced burden pertaining to repeated performance of common cluster tasks (e.g., distributed operating system upgrades, etc.), and/or other cluster management productivity improvements. Unfortunately, as cluster size grows (e.g., to reduce management complexity) so does the likelihood of failure of any device in the cluster. Thus, multiple competing objectives need to be considered when deciding on a data loss avoidance and remediation plan.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

Disclosed herein are techniques for implementing a multi-objective storage device grouping technique to form groups of storage devices in a cluster that store respective datasets and their replicas to achieve data consistency objectives in large-scale distributed computing clusters. In certain embodiments, a set of data loss parameters are accessed to facilitate the herein disclosed techniques. For example, the data loss parameters might derive from system data that describe certain storage device attributes (e.g., disk attributes) such as a host node identifier and location (e.g., physical location, heat map location, etc.), a make and model, an average disk failure rate, aggregate time in service, and/or other attributes. The data loss parameters might further derive from a set of policy data that describe certain policy parameters such as a replication factor, a maximum storage device group size, a maximum data loss threshold, and/or other parameters. At least a portion of the data loss parameters are considered when forming the groups so as to achieve one or more objectives. As an example, the one or more groups might be determined so as to maximize the average number of disks in a group (e.g., to minimize rebuild times) while achieving compliance with a maximum likelihood of data loss threshold. One or more datasets (e.g., vDisks) and their replicas are assigned into a respective group. In certain embodiments, the multi-objective grouping technique can invoke, based at least in part on the data loss parameters, one or more grouping algorithms to form the groups. In certain embodiments, the grouping algorithms can account for variable storage device failure rates over the storage devices in the cluster. In certain embodiments, failure rates are derived from a temperature level, and/or a mechanical vibration level, and/or a number of operating hours, etc.

FIG. 1 illustrates a distributed computing environment 100 in which embodiments of the present disclosure can be implemented. As an option, one or more variations of distributed computing environment 100 or any aspect thereof may be implemented in the context of the architecture and functionality of the embodiments described herein.

As shown in the embodiment in FIG. 1, a storage area comprises multiple disk drives. Upon an event that might cause a change to the constituency or groupings and/or organization of the storage devices in a storage area (e.g., adding or removing disk drives to/from the storage area, and/or modifying the organization of data between storage devices), the then-current makeup of the storage area is subjected to grouping using storage device grouping agent 110. After grouping, a set of virtual disks (e.g., virtual disk $102_1$, . . . virtual disk $102_N$) in the distributed computing environment 100 are assigned to storage devices (e.g., disks) of a storage area 170. The datasets might be partitioned (e.g., into one or more blocks) and distributed across the storage area 170 to achieve one or more objectives, such as resource balancing. For data consistency purposes, one or more replicas of the datasets might also be distributed over storage area 170. Such partitioning and distribution of replicas can serve to decrease the period of time between a failure event (e.g., a storage device failure event) and a data recovery completion event of the data that had been stored at the failed storage device. A data rebuild time is the period of time between a failure event and a data recovery completion event pertaining to the data that had been stored at the failed storage device. In accordance with one performance metric, formation of larger disk groups serve to decrease the period of time (e.g., failure rebuild time) between a failure event and a data recovery event of the data stored at the failed storage device. At the same time, adding disks to a group increases the likelihood of a failure of a storage device in a group (e.g., since each additional storage device in a group brings its own corresponding individual likelihood of failure). The aforementioned storage devices (also referred to herein as "disks") might be hard disk drives, or might be solid state disk drives, or might be hybrid disk drives that combine the media used for hard disk drives together with the media used for solid state storage devices, or might be or use any technology or technologies that serve to store data (e.g., via WRITEs) for later access (e.g., via READs).

As illustrated in the two variable graph depicted in FIG. 1, while increasing the number of disks to store a dataset and its replica(s) can decrease the failure rebuild time, such an increase may also increase the overall data loss probability. The data loss probability curve increases as more disks are added. This is because (1) each disk brings its own likelihood of a first failure event, and (2) having more disks increases the probability that a second disk failure event occurs before the data recovery event of a first disk failure event. In some cases, the number of disks assigned to a given virtual disk or set of virtual disks is such that the data loss probability might be "unacceptable" (e.g., surpasses a maximum data loss probability threshold).

The herein disclosed techniques address such challenges with growing clusters and/or storage areas by constraining the distribution of datasets and their replicas to manage data consistency objectives, such as failure rebuild times, data loss probabilities, and/or other objectives. Specifically, and as shown in FIG. 1, a storage device grouping agent 110 can implement a multi-objective disk grouping technique to form disk groups (e.g., disk group $114_1$ and disk group $114_2$) in storage area 170 (operation 112). The storage device grouping agent 110 accesses a set of data loss parameters 120 such as the examples shown, a set of policies (e.g., policy data 130 comprising the examples shown), and a set of system attributes 140 such as the examples shown to facilitate formation of the disk groups. Data loss parameters 120 and/or system attributes 140 might include or be derived from various system topology data and/or other information from the distributed computing environment 100. The policy data 130 can specify rules, and/or constraints, and/or configuration settings, such as a replication factor, etc. The storage device grouping agent 110 can store groupings to a non-volatile storage device (e.g., stored groupings 125), which can be consulted on an ongoing basis, such as when assigning a dataset to a disk group. In many situations, an event such as adding or removing a storage device to a storage area, and/or otherwise making a change to the constituency or groupings and/or organization of the storage devices in a storage area, and/or any other storage-related change or proposed change can invoke operations within the shown storage device grouping agent 110. Specifically, operation 112 can be invoked for any event or reason that might affect data consistency in a storage area (e.g., a storage area of a cluster).

As can be observed in the graph of FIG. 1, the number of disks (e.g., four disks in disk group $114_1$ and three disks in disk group $114_2$) selected for storage of the datasets and dataset replicas of virtual disk $102_1$ and virtual disk $102_N$ result in (1) an acceptable data loss probability each disk group, and (2) an acceptable failure rebuild time for each disk group. Specifically, and as shown in the graph, values of both the data loss probability parameter as well as values of the failure rebuild time parameter lie within an "acceptable" value range (e.g., as shown in the "Acceptable" region of the graph).

The graph shown in FIG. 1 is merely for illustrative purposes. More specific quantitative codification of the variables exist, and more specific relationships between the aforementioned variables and metrics can be calculated using quantities in equations. Specifically, the probability of a second disk failure occurring within a rebuild time t following a first disk failure can be expressed by:

$$P_{secondFault} = 1-(1-\lambda t)^{ND} \quad \text{(EQ. 1)}$$

where:
N=number of nodes,
D number of disks in each node, and
λ=average disk failure rate of the disks.
For a very small λ, this probability can be approximated by:

$$P_{secondFault} = \lambda NDt \quad \text{(EQ. 2)}$$

In most cases, datasets and their replicas are distributed randomly across the set of D disks. As such, the data loss probability is given by a probability value $P_{loss}$. More specifically, and as indicated in the semantics that are characterized by the quantities of EQ. 3, the probability value $P_{loss}$ characterizes the likelihood of completely losing a given bit of data when a disk that has a copy of that given bit fails. As such, the probability value $P_{loss}$ is distinguished from a probability of losing any data in a given cluster or storage area. Since the time to rebuild data after occurrence of a first failure of a disk in a storage device group is inversely proportional to the number of disks in the storage device group (e.g., since more disks offer more aggregate storage I/O per second (IOPS) and more aggregate data throughput of the drives), the intuition is that a larger number of storage devices in a storage device group reduces the rebuild time, and this reduces the likelihood of experiencing a second fault before the rebuild completes.

$$P_{loss} = P_{secondFault} = NDt \quad \text{(EQ. 3)}$$

For example, in a cluster with four nodes (e.g., N=4) each having four disks (e.g., D=4), a rebuild time of 12 hours (e.g., t=12), and an annual disk failure rate of 2% (e.g., λ=2.3e-6 per hour), the data loss probability $P_{loss}$ is 0.04%. If the number of nodes increases to 32 (e.g., N=32), then the data loss probability $P_{loss}$ increases to 0.35%.

In certain embodiments, the herein disclosed techniques facilitate management of such data loss probability increases by forming storage device groups from the available disks in consideration of certain constraints on the number of devices in the storage device groups. Specifically, applying a maximum storage device group size g to the foregoing equations results in the following approximation for $P_{loss}$:

$$P_{loss} \approx \lambda gt \quad \text{(EQ. 4)}$$

Critically, the expression of EQ. 4 illustrates that the data loss probability is no longer a function of cluster size (e.g., N) when the disks are grouped according to the herein disclosed techniques. As an example, with no storage device grouping, a cluster with 1000 nodes (e.g., N=1000) having four disks per node (e.g., D=4), a rebuild time of 12 hours (e.g., t=12 hours), and the aforementioned disk failure rate (e.g., λ=2.3e-6 per hour), would have a data loss probability of $P_{loss}$=11% after a first disk failure event. When grouping the disks with a maximum storage device group size of 10 (e.g., g=10), the data loss probability is reduced to $P_{loss}$=0.03%. In example environments, the rebuild time t can have a dependence on the maximum storage device group size g. This dependence might be captured in a table that maps certain values of g to certain values of t. Such a mapping is given in Table 1.

TABLE 1

Rebuild time map

| Type of Drives | Rebuild Time | Calculated Group Size |
|---|---|---|
| Rotating media drives | 12 hours | 4 drives |
| Rotating media drives | 6 hours | 8 drives |

TABLE 1-continued

Rebuild time map

| Type of Drives | Rebuild Time | Calculated Group Size |
|---|---|---|
| Flash drives | 3 hours | 4 drives |
| Flash drives | 1.5 hours | 8 drives |

A policy such as a service level agreement (SLA) or other service level constraint might specify a maximum acceptable time for a rebuild. A mapping table such as Table 1 can be consulted to determine a corresponding group size that has been calculated or determined empirically based on various types of disk drives used in a group. In some cases, a particular maximum acceptable time for a rebuild might inform the possibilities for types of drives and/or a corresponding minimum storage device group size needed to carry out a rebuild within the maximum acceptable rebuild time. For example, if an SLA demands a maximum acceptable rebuild time of "3 hours", then given the values of the rows of Table 1, only storage device groups comprised of flash drives can be used when forming storage device groups. In some cases, group sizes might be calculated or constrained based on topological considerations. For example, if a physical partition (e.g., a node's motherboard) supports only four drives in that partition, then one or more policies might specify a maximum group size of 4.

Figure 2:
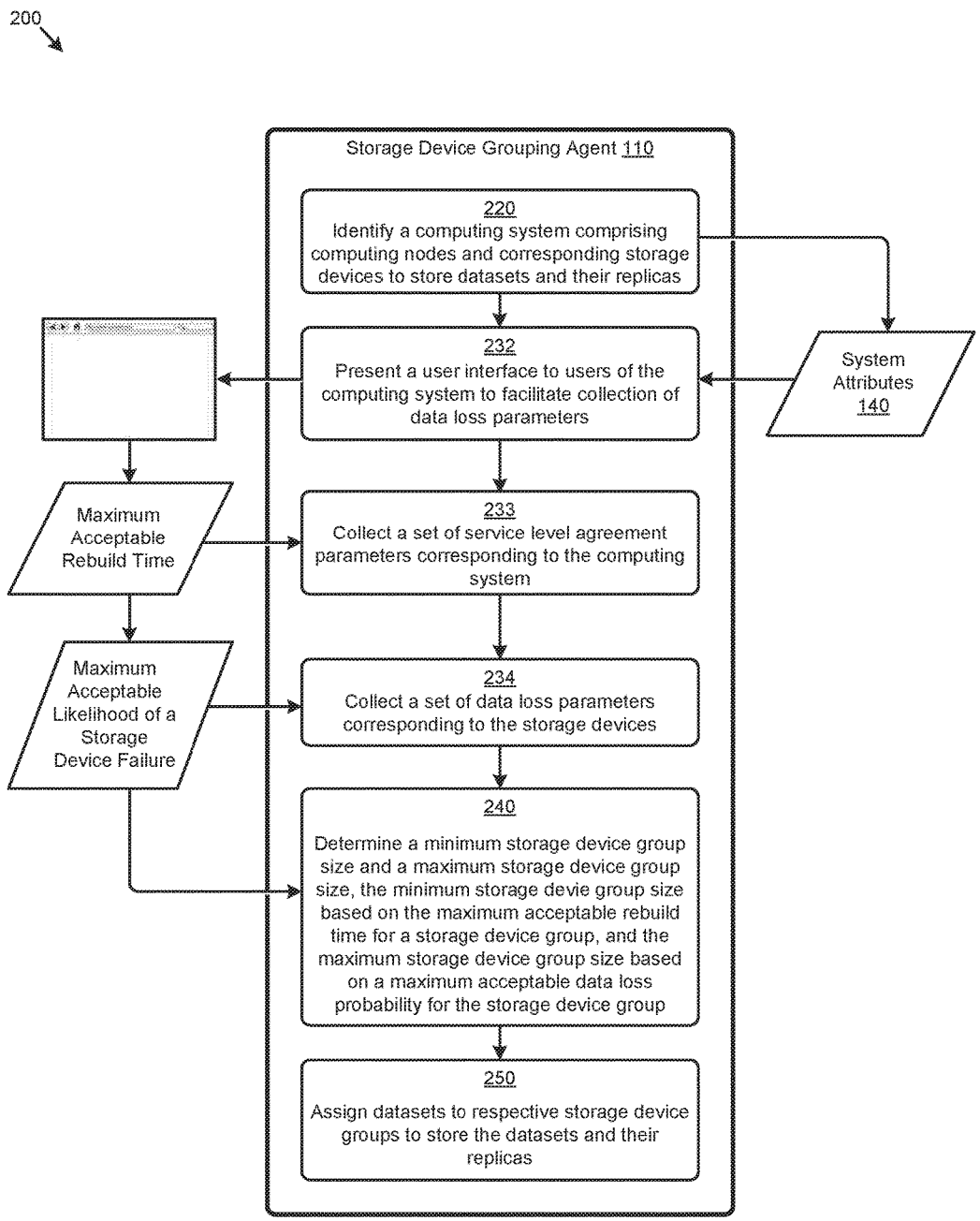
FIG. 2 depicts a data consistency management technique as implemented in systems that achieve cluster-wide data loss protection while allowing for computing cluster expansion, according to some embodiments.

A data consistency management technique implemented according to the herein disclosed techniques is shown and described as pertains to FIG. 2.

FIG. 2 depicts a data consistency management technique 200 as implemented in systems that achieve cluster-wide data loss protection while allowing for computing cluster expansion. As an option, one or more variations of data consistency management technique 200 or any aspect thereof may be implemented in the context of the architecture and functionality of the embodiments described herein. The data consistency management technique 200 or any aspect thereof may be implemented in any environment.

The data consistency management technique 200 presents one embodiment of certain steps and/or operations that facilitate cluster-wide data loss protection while allowing for computing cluster expansion. As shown, the steps and/or operations can be performed by storage device grouping agent 110. As illustrated, the data consistency management technique 200 can commence by identifying a computing system that comprises a set of computing nodes and corresponding storage devices (e.g., disks) to store datasets and their replicas (step 220). For example, the computing system might be a distributed computing and storage system cluster that supports virtual disks (e.g., vDisks) with associated datasets and replicas stored in a pool of physical storage devices. In the embodiment of FIG. 2, a user interface is presented to users of the computing system to facilitate collection of system attributes 140, a maximum acceptable rebuild time, and a maximum acceptable likelihood of data loss (step 232).

The user interface, for example, might be accessed by a system administrator to set certain policy parameters (e.g., replication factor, maximum data loss probability, etc.) and/or identify the location of certain data (e.g., topology data, disk specifications, etc.) pertaining to the herein disclosed techniques.

Step 233 serves to collect a set of service level agreement parameters corresponding to the computing system, and step 234 serves to collect a set of data loss parameters pertaining to the storage devices (e.g., disks) of the computing system. The service level agreement parameters and at least some of the data loss parameters are consulted to determine the minimum size and maximum size of storage device groups that comprise respective subsets of the storage devices. As shown, a minimum storage device group size and a maximum storage device group size are determined based on a maximum acceptable rebuild time, and a maximum storage device group size is based on a data loss probability for the group (step 240). Various datasets (e.g., associated with vDisks) are then assigned to the storage device groups so that storage of each dataset and its replicas are constrained to the storage devices (e.g., disks) of a storage device group assigned to the dataset (step 250).

Figure 3:
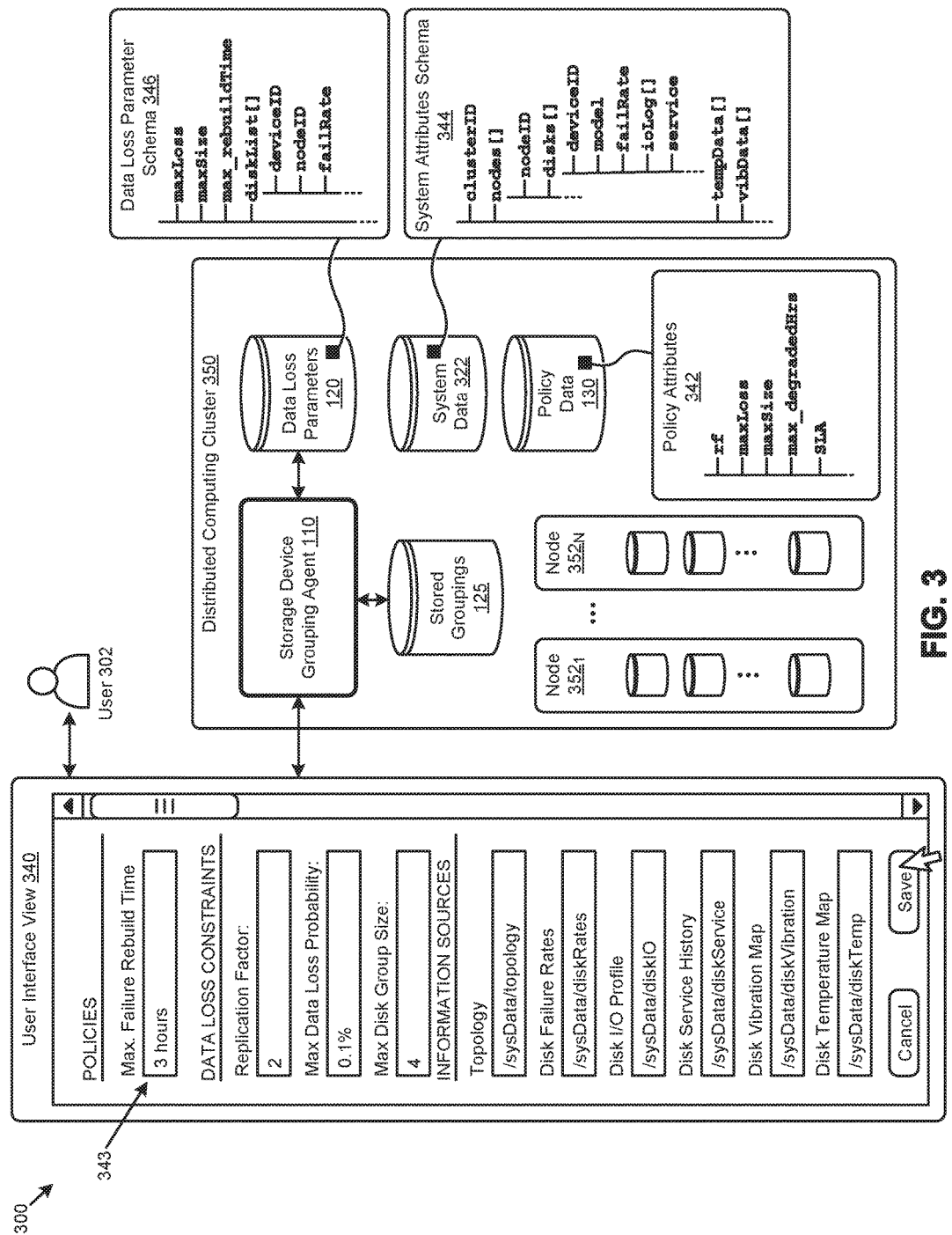
FIG. 3 presents a data loss parameter collection technique as implemented in systems that facilitate cluster-wide data loss protection while allowing for computing cluster expansion, according to an embodiment.

Further details pertaining to techniques associated with specification and/or collection of the data loss parameters are shown and described as pertains to FIG. 3.

FIG. 3 presents a data loss parameter collection technique 300 as implemented in systems that facilitate cluster-wide data loss protection while allowing for computing cluster expansion. As an option, one or more variations of data loss parameter collection technique 300 or any aspect thereof may be implemented in the context of the architecture and functionality of the embodiments described herein. The data loss parameter collection technique 300 or any aspect thereof may be implemented in any environment.

The data loss parameter collection technique 300 depicts storage device grouping agent 110 operating in a distributed computing cluster 350. The distributed computing cluster 350 comprises a set of representative nodes (e.g., node $352_1$, . . . , node $352_N$) each having an associated set of storage devices (e.g., disks). A set of system data 322 is implemented at distributed computing cluster 350 to store various information about the cluster. The data comprising system data 322 and/or any data structure described herein can be organized and/or stored using various techniques. For example, the data comprising system data 322 might be organized and/or stored in a tabular structure (e.g., relational database table) that has rows corresponding to a particular cluster and/or cluster entity and columns corresponding to attributes pertaining to the cluster and/or cluster entity. As another example, system data 322 might be organized and/or stored in a programming code object that has instances corresponding to a particular cluster and/or cluster entity and properties corresponding to the various attributes pertaining to that cluster and/or cluster entity.

More specifically, as depicted in the set of representative system attributes schema 344, system data 322 might describe a cluster identifier (e.g., stored in a "clusterID" field), a list of nodes (e.g., stored in a "nodes[ ]" object), a temperature map (e.g., stored in a "tempData[ ]" object), a vibration map (e.g., stored in a "vibData[ ]" object), and/or other system attributes. As can be observed, each instance (e.g., for each node in a cluster) of the object associated with the list of nodes might describe a node identifier (e.g., stored in a "nodeID" field), a list of storage devices (e.g., stored in a "disks[ ]" object), and/or other node attributes. Each instance (e.g., for each storage device in a node) of the object associated with the list of storage devices might describe a device identifier (e.g., stored in a "deviceID" field), a model identifier (e.g., stored in a "model" field), a disk failure rate (e.g., stored in a "failRate" field), a storage I/O (input/output or IO) activity history (e.g., stored in an "ioLog[ ]" object), a date the storage device was placed in service (e.g., stored in a "service" field), and/or other storage device attributes.

The distributed computing cluster 350 might implement a set of policies to store various information pertaining to the certain policies (e.g., data retention policy, disk grouping policy, etc.) associated with the cluster and/or cluster entities. As shown in a representative set of policy attributes 342, the policies might describe a replication factor (e.g., stored in an "rf" field), a maximum data loss probability (e.g., stored in a "maxLoss" field), a maximum group size (e.g., stored in a "maxSize" field), a maximum time the system is permitted to be operating in a degraded mode during a rebuild (e.g., stored in a "max_degradedHrs" field), and/or other policy statement or settings, or characteristics as may be stored in or derived from a service level agreement (SLA). Other policy attributes can be store in or derived from user inputs or other specifications such as introduced in the discussion of the aforementioned user interface view 340 of FIG. 3.

In a particular embodiment, the user interface view 340 depicts a maximum rebuild time constraint that specifies the maximum amount of time permitted for drive rebuilding activities after a failure event. The shown failure rebuild time constraint value 343 of "3 hours" can be used in conjunction with a data structure such as Table 1. As an example, a lookup operation into a data structure such as Table 1 reveals that a rebuild time that is constrained (e.g., by policy) to required not more than 3 hours can be accomplished if flash drives are used in groups that comprise at least 4 flash devices per group.

In the foregoing example, the failure rebuild time constraint value 343 is derived from a policy statement. In other situations, determination of a particular failure rebuild time constraint value might be based on the likelihood of experiencing a second failure event within a group. Strictly as one example, if a group comprises M drives and some of those M drives are known to have been in operation for a span of time after the mean-time-to-failure (MTBF), then the likelihood of a second failure of a device in that group is higher than the likelihood of a second failure of a device in a group that is populated with devices that have lower time in service metrics. As such, a failure rebuild time constraint value 343 might be dynamically determined from or derived from then-current characteristics of drives and/or their environmental conditions.

As aforementioned, a failure rebuild time constraint can be stored in or derived from a service level agreement (SLA). However, the actual time needed to perform a particular rebuild in non-RAID environment correlates to the time needed for actually copying replicated extents from a first drive member of a set of drives to other drive members of the same set of drives. Using the herein-disclosed techniques, replica destinations are selected so as to ensure that multiple replicas of the same extent do not reside on the same drive. The actual time needed to perform a particular rebuild in non-RAID environment depends on a large number of system characteristics such as speeds of individual drives, storage I/O capabilities, distances between drives, etc. An actual time to perform a rebuild in a given configuration can be estimated from empirical performance data, or from theoretical calculations, or from combinations of both empirical performance data and theoretical calculations.

In some embodiments, information pertaining to policies might be codified in one or more configuration files and/or might be stored and retrieved through use of command line interfaces. In some embodiments, such as the embodiment depicted in FIG. 3, a user interface is presented to a user (e.g., system administrator) to specify certain policy attributes with the aid of graphical screen devices. Specifically, and as shown, a user interface view 340 (e.g., a view or window comprised of a set of graphical screen devices) is presented to a user 302.

The user interface view 340 presents an input component (e.g., text box) to facilitate specification of a "Replication Factor" (e.g., "2"), a "Max Data Loss Probability" (e.g., "0.1%"), and a "Max Disk Group Size" (e.g., "4"). Further illustrated in user interface view 340 are input components to identify the locations of certain information sources. Such information sources might be accessed by storage device grouping agent 110 in certain embodiments of the herein disclosed techniques. For example, storage device grouping agent 110 might call a service at "/sysData/topology" (e.g., specified in user interface view 340) to retrieve a set of information pertaining to the topology (e.g., nodes, storage devices, etc.) of the distributed computing cluster 350. A service at "/sysData/diskTemp" might be called to retrieve information pertaining to a map of the operating and/or ambient temperatures of the components within the cluster. Other locations and/or services corresponding to other information can be specified as shown. When user 302 is satisfied with the entered inputs, a "Save" button can be clicked to persistently store the inputs for access by the storage device grouping agent 110.

The data loss parameters 120 that are accessed by storage device grouping agent 110 are derived from the foregoing user interface inputs, system data 322, and/or policy data of any provenance. In some cases, the storage device grouping agent 110 might perform operations to populate at least a portion of the data loss parameters 120. For example, the storage device grouping agent 110 might invoke the services specified by user 302 in user interface view 340 to populate a portion of the data loss parameters 120. As shown in data loss parameters schema 346, the data loss parameters 120 might describe a maximum data loss probability (e.g., stored in a "maxLoss" field), a maximum disk group size (e.g., stored in a "maxSize" field), a maximum acceptable failure rebuild time (e.g., stored in a "max_rebuildTime" field), a list of disk attributes (e.g., stored in a "diskList[ ]" object), and/or other parameters. The maximum data loss probability and the maximum disk group size might be copied without change from and/or using the corresponding attributes that are stored in the policy data. The "diskList[ ]" object properties (e.g., "deviceID", "nodeID", "failRate", etc.) might further be derived from the "disks[ ]" object in system data 322 (e.g., system attributes schema 344).

When the storage device grouping agent 110 has completed forming a particular group, the storage device grouping agent 110 can store the constituency of the particular group to a non-volatile storage device (e.g., stored groupings 125), which can be consulted on an ongoing basis, such as when assigning a dataset to a group.

Various techniques and scenarios for determining the groups (e.g., disk groups or other storage device groups) from the data loss parameters 120 (e.g., step 240 of FIG. 2) are presented and discussed as follows.

Figure 4A:
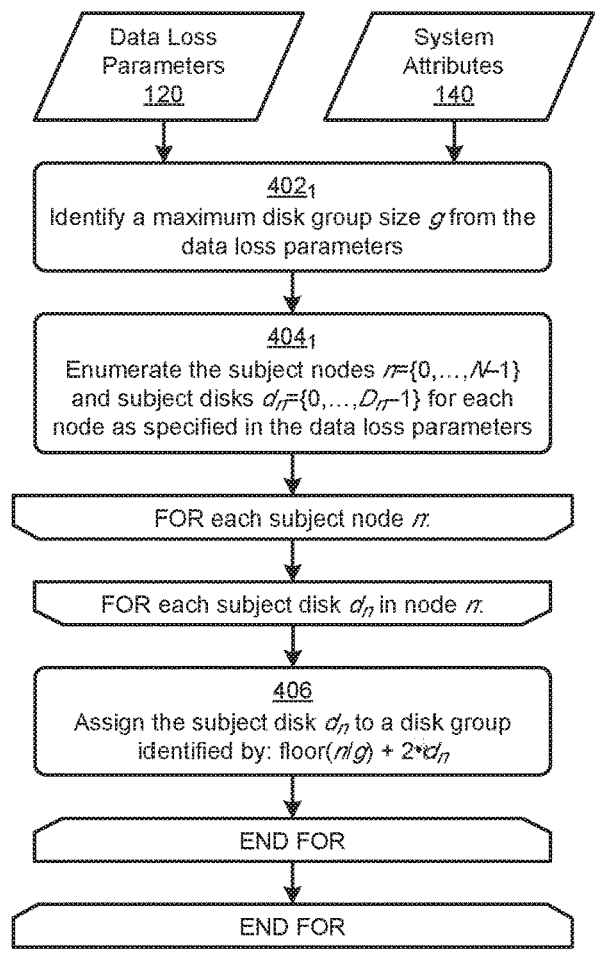
FIG. 4A presents a disk segmentation technique as implemented in systems that facilitate cluster-wide data loss protection while allowing for computing cluster expansion, according to an embodiment.

FIG. 4A presents a disk segmentation technique 4A00 as implemented in systems that facilitate cluster-wide data loss protection while allowing for computing cluster expansion. As an option, one or more variations of disk segmentation technique 4A00 or any aspect thereof may be implemented in the context of the architecture and functionality of the embodiments described herein. The disk segmentation technique 4A00 or any aspect thereof may be implemented in any environment.

The disk segmentation technique 4A00 presents one embodiment of certain steps and/or operations that facilitate formation of groups by segmentation of the disks. In certain embodiments, the disk segmentation technique 4A00 and/or its derivatives can be codified as an algorithm in a code base. As illustrated, the disk segmentation technique 4A00 can commence by identifying a maximum group size (e.g., g) from the data loss parameters (e.g., data loss parameters 120) (step $402_1$). The data loss parameters and the system attributes 140 are consulted to enumerate the subject nodes (e.g., n={0, . . . , N−1}) and subject disks (e.g., $d_n$= {0, . . . , $D_n$−1}) for each of the nodes (step $404_1$). As can be observed, certain steps and/or operations of disk segmentation technique 4A00 are iteratively performed in a set of nested "FOR" loops. The first "FOR" loop (e.g., "outer" loop) pertains to subject nodes, and the second "FOR" loop (e.g., "inner" loop) pertains to the subject disks $d_n$ of a particular node n. In one embodiment, such as is depicted in the examples of FIG. 4A and FIG. 4B, subject disks are assigned to a particular group identified by EQ. 5 (step 406):

$$\text{GroupID} = \text{floor}(n/g) + 2 \cdot d_n \quad \text{(EQ. 5)}$$

Other such equations can be used to generate a numeric groupID from numeric characteristics of a particular system's topology. The "FOR" loops are executed until all subject disks of all nodes are assigned to a respective group.

Figure 4B:
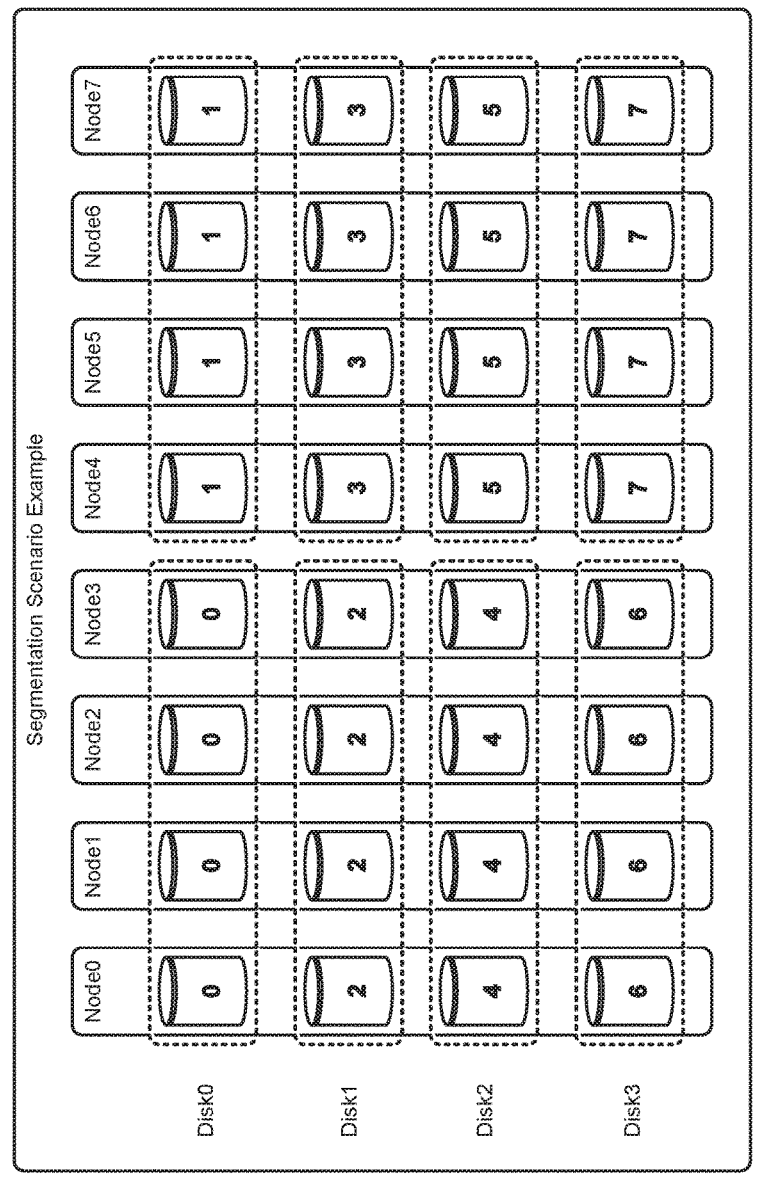
FIG. 4B depicts a disk segmentation scenario as implemented in systems that facilitate cluster-wide data loss protection while allowing for computing cluster expansion, according to an embodiment.

FIG. 4B depicts a disk segmentation scenario 4B00 as implemented in systems that facilitate cluster-wide data loss protection while allowing for computing cluster expansion. As an option, one or more variations of disk segmentation scenario 4B00 or any aspect thereof may be implemented in the context of the architecture and functionality of the embodiments described herein. The disk segmentation scenario 4B00 or any aspect thereof may be implemented in any environment.

The disk segmentation scenario 4B00 shown in FIG. 4B is merely one example implementation of the disk segmentation technique 4A00 shown and described as pertains to FIG. 4A. As can be observed, the disk segmentation scenario 4B00 considers eight subject nodes (e.g., node0, node1, node2, node3, node4, node5, node6, and node7) that each have four subject disks (e.g., disk0, disk1, disk2, and disk3). Further, disk segmentation scenario 4B00 considers a maximum group size of four (e.g., g=4). Applying the foregoing parameters and/or other information to the disk segmentation technique 4A00 results in the groups illustrated with group identifiers and boundaries of FIG. 4B.

Figure 5A:
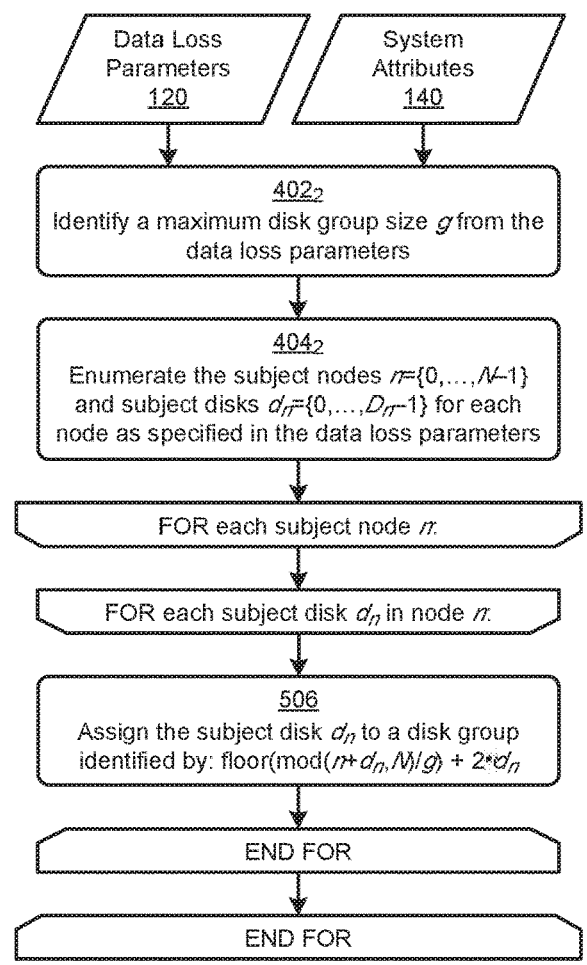
FIG. 5A presents a disk striping technique as implemented in systems that facilitate cluster-wide data loss protection while allowing for computing cluster expansion, according to an embodiment.

FIG. 5A presents a disk striping technique 5A00 as implemented in systems that facilitate cluster-wide data loss protection while allowing for computing cluster expansion. As an option, one or more variations of disk striping technique 5A00 or any aspect thereof may be implemented in the context of the architecture and functionality of the embodiments described herein. The disk striping technique 5A00 or any aspect thereof may be implemented in any environment.

The disk striping technique 5A00 presents one embodiment of certain steps and/or operations that facilitate formation of groups by striping (e.g., interleaving, staggering, etc.) of the disks in accordance with a striping function. In certain embodiments, the disk striping technique 5A00 and/or its derivatives can be codified as an algorithm in a code base. As illustrated, the disk striping technique 5A00 can commence by identifying a maximum group size (e.g., g) from the data loss parameters (e.g., data loss parameters 120) (step $402_2$). The data loss parameters and the system attributes 140 are consulted to enumerate the subject nodes (e.g., n={0, . . . , N−1}) and subject disks (e.g., $d_n$= {0, . . . , $D_n$−1}) for each of the nodes (step $404_2$). As can be observed, certain steps and/or operations of disk striping technique 5A00 are iteratively performed in a set of nested "FOR" loops. The first "FOR" loop (e.g., "outer" loop) pertains to subject nodes, and the second "FOR" loop (e.g., "inner" loop) pertains to the subject disks do of a particular node n. Specifically, each of these subject disks are assigned to a group identified by the striping function given in equation EQ. 6 (step 506):

$$\text{GroupID} = \text{floor}(\text{mod}(n + d_n N)/g) + 2 \cdot d_n \quad \text{(EQ. 6)}$$

The "FOR" loops are executed until all subject disks of all nodes are assigned to a respective group.

Figure 5B:
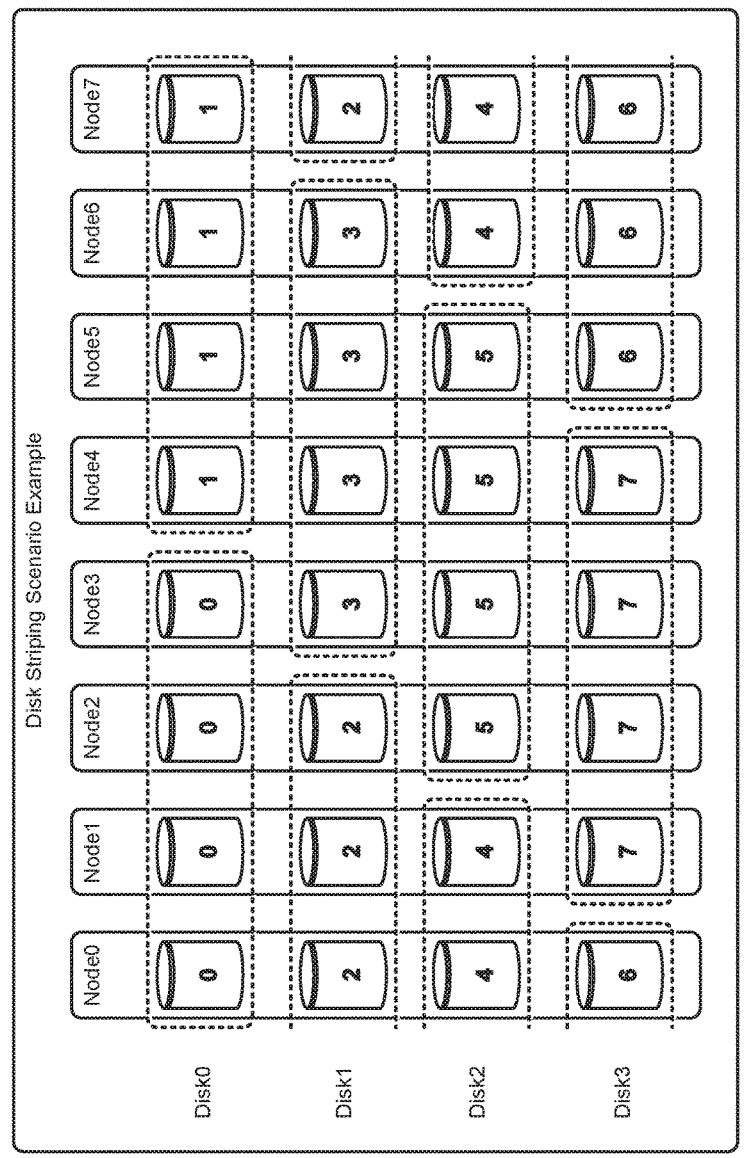
FIG. 5B illustrates a disk striping scenario as implemented in systems that facilitate cluster-wide data loss protection while allowing for computing cluster expansion, according to an embodiment.

FIG. 5B illustrates a disk striping scenario 5B00 as implemented in systems that facilitate cluster-wide data loss protection while allowing for computing cluster expansion. As an option, one or more variations of disk striping scenario 5B00 or any aspect thereof may be implemented in the context of the architecture and functionality of the embodiments described herein. The disk striping scenario 5B00 or any aspect thereof may be implemented in any environment.

The disk striping scenario 5B00 shown in FIG. 5B is merely one example implementation of the disk striping technique 5A00 shown and described as pertains to FIG. 5A. As can be observed, the disk striping scenario 5B00 considers eight subject nodes (e.g., node0, node1, node2, node3, node4, node5, node6, and node7) that each have four subject disks (e.g., disk0, disk1, disk2, and disk3). Further, disk striping scenario 5B00 considers a maximum group size of four (e.g., g=4). Applying the foregoing parameters and/or other information to the disk striping technique 5A00 results in the groups illustrated with group identifiers and boundaries of FIG. 5B.

Figure 6A:
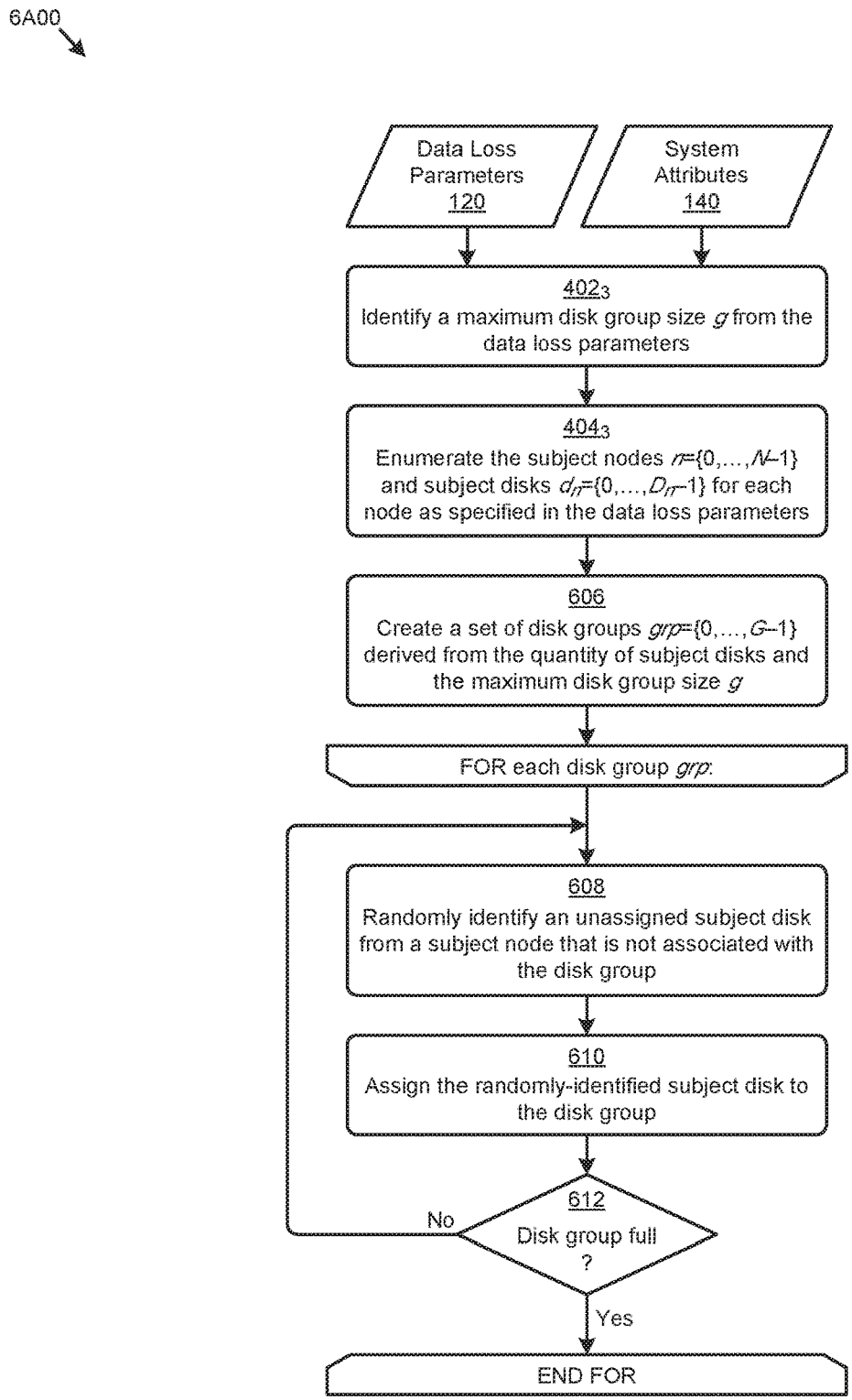
FIG. 6A presents a random disk grouping technique as implemented in systems that facilitate cluster-wide data loss protection while allowing for computing cluster expansion, according to an embodiment.

FIG. 6A presents a random disk grouping technique 6A00 as implemented in systems that facilitate cluster-wide data loss protection while allowing for computing cluster expansion. As an option, one or more variations of random disk grouping technique 6A00 or any aspect thereof may be implemented in the context of the architecture and functionality of the embodiments described herein. The random disk grouping technique 6A00 or any aspect thereof may be implemented in any environment.

The random disk grouping technique 6A00 presents one embodiment of certain steps and/or operations that facilitate formation of groups by a random assignment of the disks to the groups. In certain embodiments, the random disk grouping technique 6A00 and/or its derivatives can be codified as an algorithm in a code base. As illustrated, the random grouping technique 6A00 can commence by identifying a maximum group size (e.g., g) from the data loss parameters (e.g., data loss parameters 120) (step $402_3$). The data loss parameters 120 and the system attributes 140 are consulted to enumerate the subject nodes (e.g., n={0, . . . , N−1}) and subject disks (e.g., $d_n$={0, . . . , $D_n$−1}) for each of the nodes (step $404_3$). A set of groups (e.g., grp={0, . . . , G−1}) are created based at least in part on the total quantity of subject disks and the maximum group size (step 606). For each group (see "FOR" loop), a next storage device (e.g., an unassigned subject disk from a subject node that is not associated with the group) is randomly identified (step 608). The randomly-identified subject disk is then assigned to the group (step 610). If the then-current group is not full (see "No" path of decision 612), then another unassigned subject disk is randomly identified and assigned to the then-current group. When the then-current group is full (see "Yes" path of decision 612), then processing for the then-current group is complete. The "FOR" loop is executed until all subject disks of all nodes are assigned to a respective group.

Figure 6B:
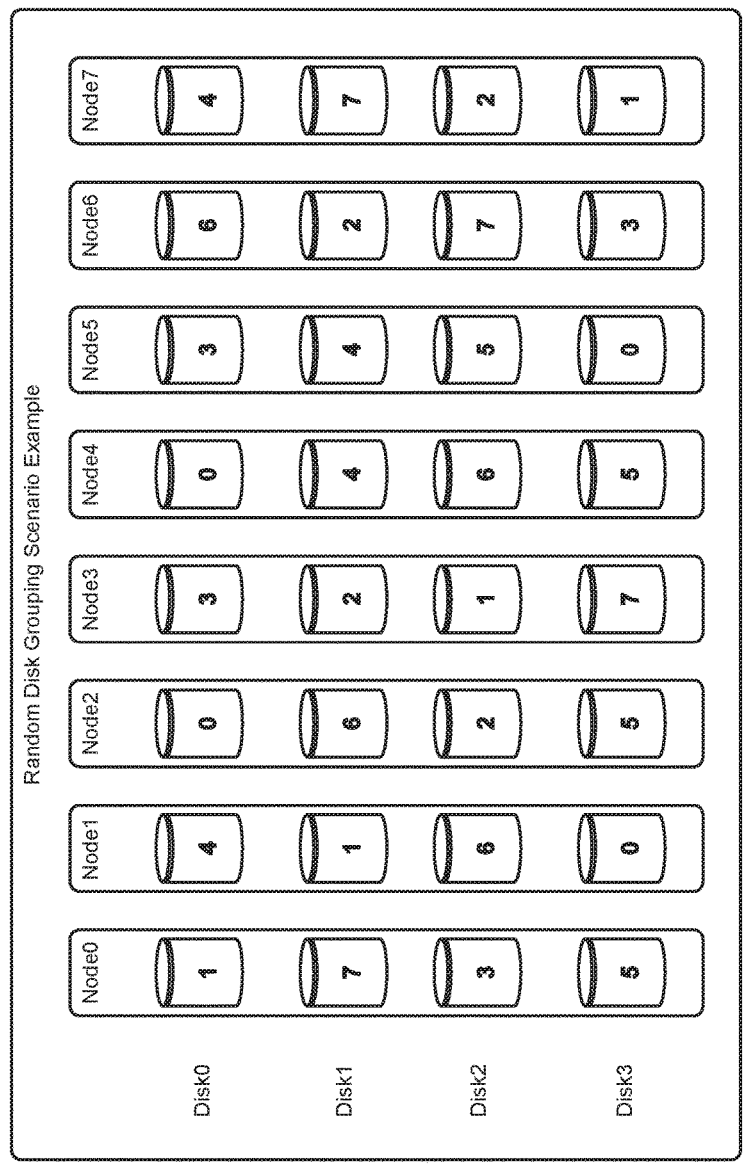
FIG. 6B depicts a random disk grouping scenario as implemented in systems that facilitate cluster-wide data loss protection while allowing for computing cluster expansion, according to an embodiment.

FIG. 6B depicts a random disk grouping scenario 6B00 as implemented in systems that facilitate cluster-wide data loss protection while allowing for computing cluster expansion. As an option, one or more variations of random disk grouping scenario 6B00 or any aspect thereof may be implemented in the context of the architecture and functionality of the embodiments described herein. The random disk grouping scenario 6B00 or any aspect thereof may be implemented in any environment.

The random disk grouping scenario 6B00 shown in FIG. 6B is merely one example implementation of the random disk grouping technique 6A00 shown and described as pertains to FIG. 6A. As can be observed, the random disk grouping scenario 6B00 considers eight subject nodes (e.g., node0, node1, node2, node3, node4, node5, node6, and node7) that each have four subject disks (e.g., disk0, disk1, disk2, and disk3). Further, random disk grouping scenario 6B00 considers a maximum group size of four (e.g., g=4). Applying the foregoing parameters and/or other information to the random disk grouping technique 6A00 results in the groups illustrated with group identifiers in FIG. 6B.

Figure 7A:
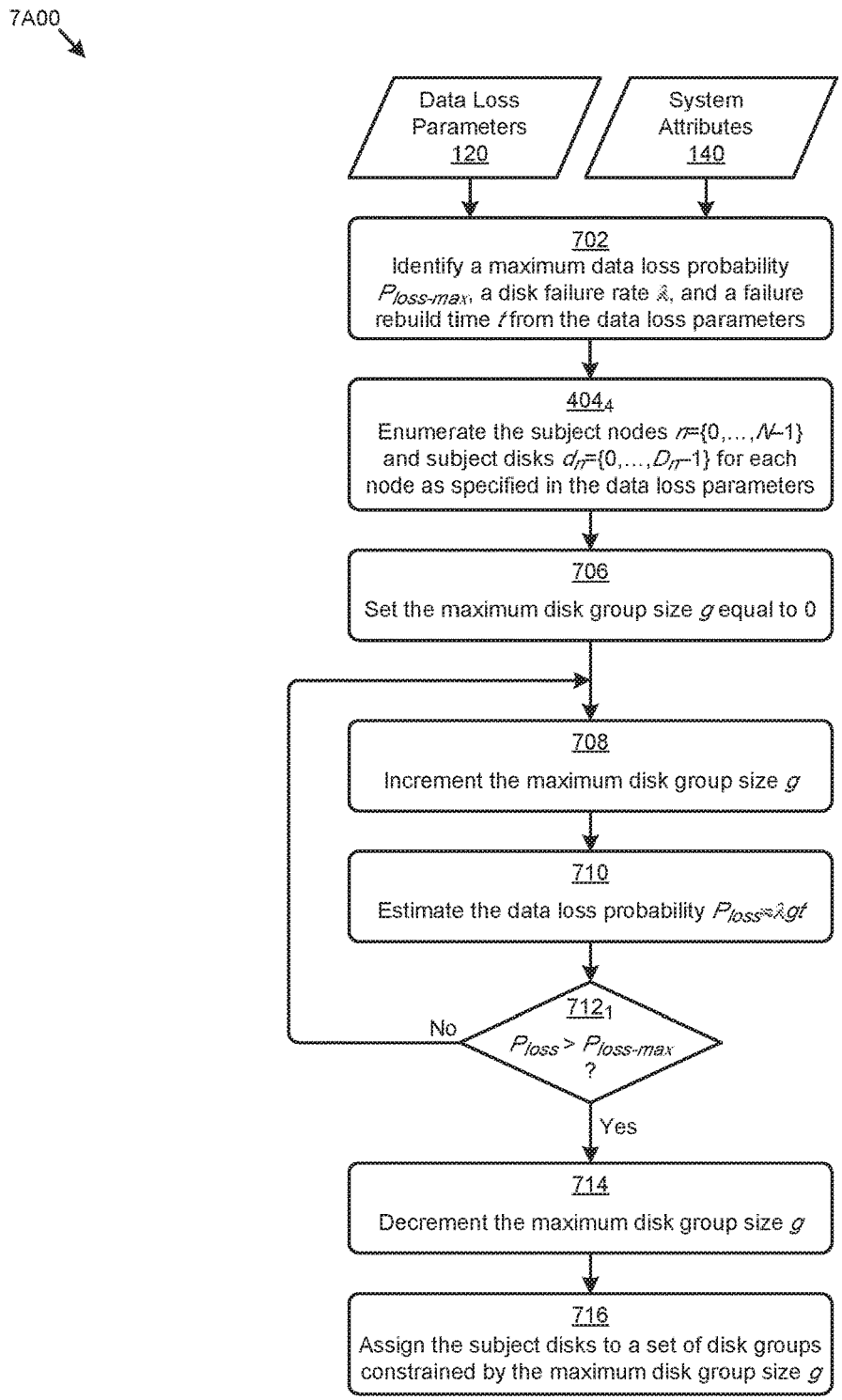
FIG. 7A presents a homogeneous disk grouping technique as implemented in systems that facilitate cluster-wide data loss protection while allowing for computing cluster expansion, according to an embodiment.

FIG. 7A presents a homogeneous disk grouping technique 7A00 as implemented in systems that facilitate cluster-wide data loss protection while allowing for computing cluster expansion. As an option, one or more variations of homogeneous disk grouping technique 7A00 or any aspect thereof may be implemented in the context of the architecture and functionality of the embodiments described herein. The homogeneous disk grouping technique 7A00 or any aspect thereof may be implemented in any environment.

The homogeneous disk grouping technique 7A00 presents one embodiment of certain steps and/or operations that facilitate formation of disk groups comprising disks that have certain homogeneous attributes, such as disk failure rate. In certain embodiments, the homogeneous disk grouping technique 7A00 and/or its derivatives can be codified as an algorithm in a code base. As illustrated, the homogeneous disk grouping technique 7A00 can commence by identifying a maximum data loss probability (e.g., $P_{loss-max}$), a disk failure rate (e.g., $\lambda$), and a failure rebuild time (e.g., t) from the data loss parameters (e.g., data loss parameters 120) (step 702). For example, the maximum data loss probability might be established by a system administrator, while the disk failure rate and/or the failure rebuild time might be specified and/or learned (e.g., by a learning model) over time. The data loss parameters 120 and the system attributes 140 are consulted to enumerate the subject nodes (e.g., n= $\{0, \ldots, N-1\}$) and subject disks (e.g., $d_n=\{0, \ldots, D_n-1\}$) for each of the nodes (step $404_4$). The maximum group size (e.g., g) is initially set to zero (step 706).

The maximum group size is incremented (step 708), and the data loss probability (e.g., $P_{loss}$) for the then-current maximum group size g is estimated using EQ. 4 (step 710). If the data loss probability does not exceed the maximum data loss probability (see "No" path of decision $712_1$), the maximum group size is incremented (step 708) and the data loss probability for the incremented maximum group size is checked again. The maximum group size will continue to increase until the data loss probability exceeds the maximum data loss probability (see "Yes" path of decision $712_1$). When the then-current maximum group size results in a breach of the maximum data loss probability threshold, the maximum group size is decremented to a size that complies with the threshold (step 714). The subject disks are then assigned to a set of groups that are constrained by the decremented maximum group size (step 716). Any of the herein disclosed techniques and/or algorithms (e.g., a disk segmentation technique, a disk striping technique, a random disk grouping technique, etc.) can be implemented to assign the subject disks to the groups.

Figure 7B:
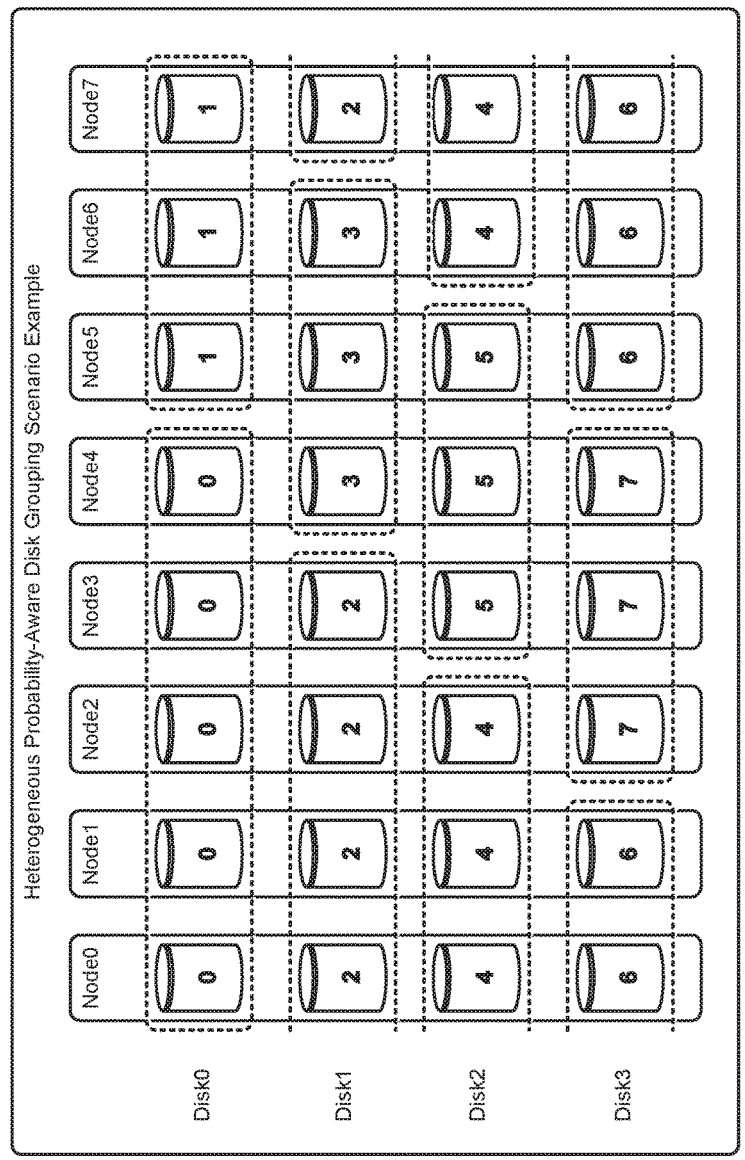
FIG. 7B illustrates a homogeneous disk grouping scenario as implemented in systems that facilitate cluster-wide data loss protection while allowing for computing cluster expansion, according to an embodiment.

FIG. 7B illustrates a homogeneous disk grouping scenario 7B00 as implemented in systems that facilitate cluster-wide data loss protection while allowing for computing cluster expansion. As an option, one or more variations of homogeneous disk grouping scenario 7B00 or any aspect thereof may be implemented in the context of the architecture and functionality of the embodiments described herein. The homogeneous disk grouping scenario 7B00 or any aspect thereof may be implemented in any environment.

The homogeneous disk grouping scenario 7B00 shown in FIG. 7B is merely one example implementation of the homogeneous disk grouping technique 7A00 shown and described as pertains to FIG. 7A. As can be observed, the homogeneous disk grouping scenario 7B00 considers eight subject nodes (e.g., node0, node1, node2, node3, node4, node5, node6, and node7) that each have four subject disks (e.g., disk0, disk1, disk2, and disk3). Further, random disk grouping scenario 6B00 considers a maximum group size of four (e.g., g=4). As shown, applying the foregoing parameters and/or other information to the homogeneous disk grouping technique 7A00 results in a maximum group size of five (e.g., g=5), which in turn constrains the formation of the illustrated groups.

Figure 8A:
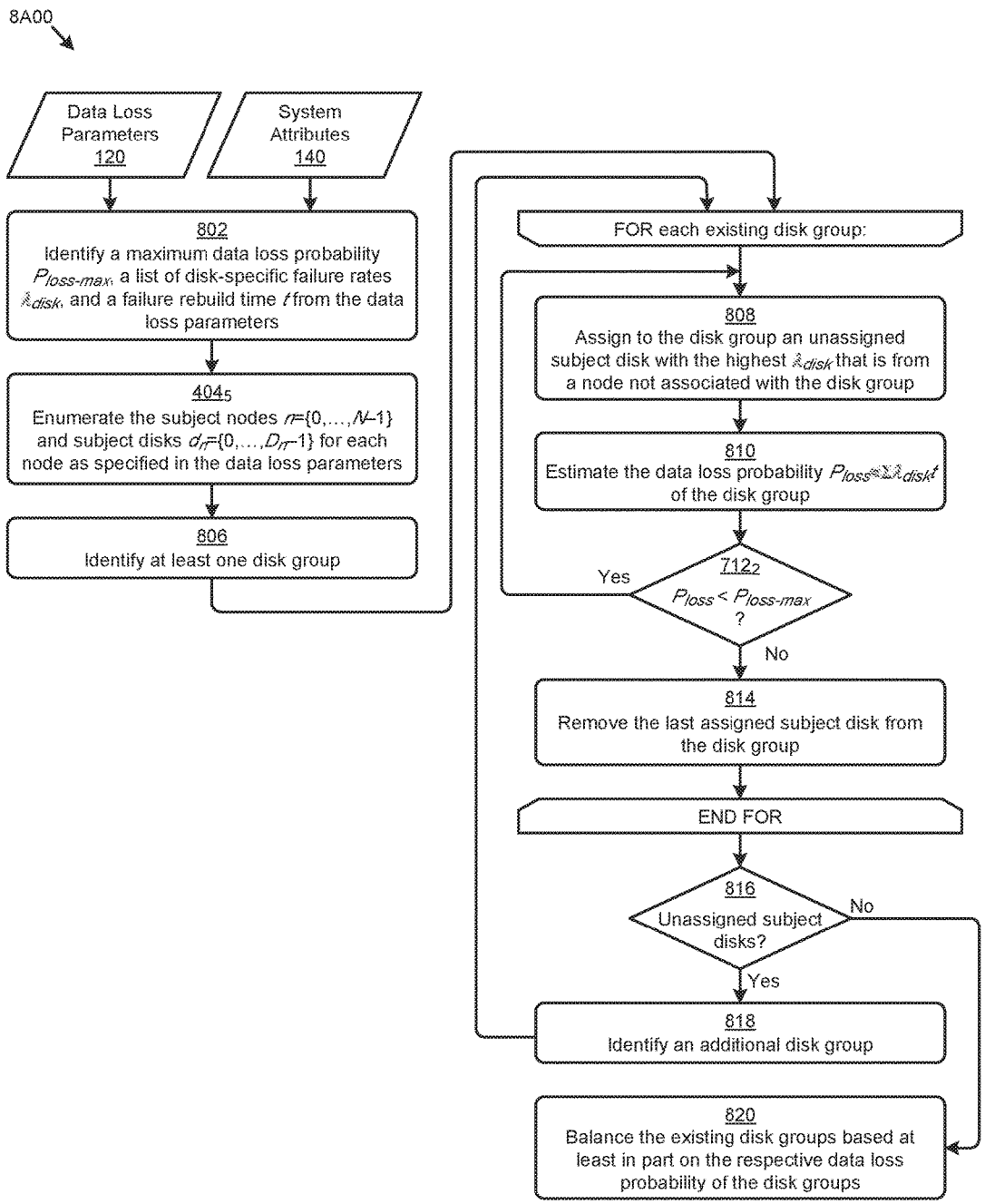
FIG. 8A presents a heterogeneous disk grouping technique as implemented in systems that facilitate cluster-wide data loss protection while allowing for computing cluster expansion, according to an embodiment.

FIG. 8A presents a heterogeneous disk grouping technique 8A00 as implemented in systems that facilitate cluster-wide data loss protection while allowing for computing cluster expansion. As an option, one or more variations of heterogeneous disk grouping technique 8A00 or any aspect thereof may be implemented in the context of the architecture and functionality of the embodiments described herein. The heterogeneous disk grouping technique 8A00 or any aspect thereof may be implemented in any environment.

In certain embodiments, the grouping algorithms can account for variable disk failure rates over the disks in the cluster. In certain embodiments, the disk failure rates can be taken from or derived from characteristics of known chassis, and/or from characteristics of specific device models, and/or from temperature predictions, and/or from empirical temperature measurements, and/or from vibration predictions, and/or from empirical vibration measurements, and/or from predicted or empirical slot-specific vibration or temperature measurements and/or location-specific vibration or temperature measurements, and/or from time-in-service indications.

The heterogeneous disk grouping technique 8A00 presents one embodiment of certain steps and/or operations that facilitate formation of groups comprising disks that have certain heterogeneous attributes, such as disk-specific failure rates. In some cases, the disk-specific failure rates might be a function of an operating and/or ambient temperature level (e.g., in a "hot" corner of the appliance rack), a mechanical vibration level (e.g., from a cooling fan), a number of operating hours, and/or other parameters. In certain embodiments, the heterogeneous disk grouping technique 8A00 and/or its derivatives can be codified as an algorithm in a code base. As illustrated, the heterogeneous disk grouping technique 8A00 can commence by identifying a maximum data loss probability (e.g., $P_{loss-max}$), a list of disk-specific failure rates (e.g., $\lambda_{disk}$), and a failure rebuild time (e.g., t) from the data loss parameters (e.g., data loss parameters 120) (step 802). For example, the maximum data loss probability might be established by a system administrator, while the disk failure rates and/or the failure rebuild time might be specified and/or learned (e.g., by a learning model) over time. The data loss parameters 120 and the system attributes 140 are consulted to enumerate the subject nodes (e.g., n={0, . . . , N−1}) and subject disks (e.g., $d_n$={0, . . . , $D_n$−1}) for each of the nodes (step $404_5$). At least one group is identified (step 806).

For each existing group (see "FOR" loop), a next storage device (e.g., the next disk being an unassigned subject disk with the highest disk-specific failure rate from a node not associated with the group) is assigned to the group (step 808). The data loss probability of the group is estimated using equation EQ. 7 (step 810):

$$P_{loss} \approx \Sigma \lambda_{disk} t \qquad \text{(EQ. 7)}$$

If the data loss probability does not exceed the maximum data loss probability (see "No" path of decision $712_2$), an unassigned subject disk with the next highest disk-specific failure rate is assigned to the group and the data loss probability is checked again. Subject disks will continue to be added to the group until the data loss probability exceeds the maximum data loss probability (see "Yes" path of decision $712_2$). When the then-current group composition results in a breach of the maximum data loss probability threshold, the last assigned subject disk is removed from the group to comply with the threshold (step 814). If unassigned subject disks remain following completion of assignments to the then-current set of existing groups (see "Yes" path of decision 816), an additional group is identified (step 818) and filled according the foregoing steps and/or operations.

When no unassigned subject disks remain (see "No" path of decision 816), the existing groups are balanced based at least in part on the respective data loss probability of the groups (step 820). For example, the heterogeneous grouping technique 8A00 may form some groups that have more constituents (e.g., disks) than other groups. In these cases, the groups can be balanced in terms of size, as illustrated in the scenario presented and discussed as pertains to FIG. 8B.

Figure 8B:
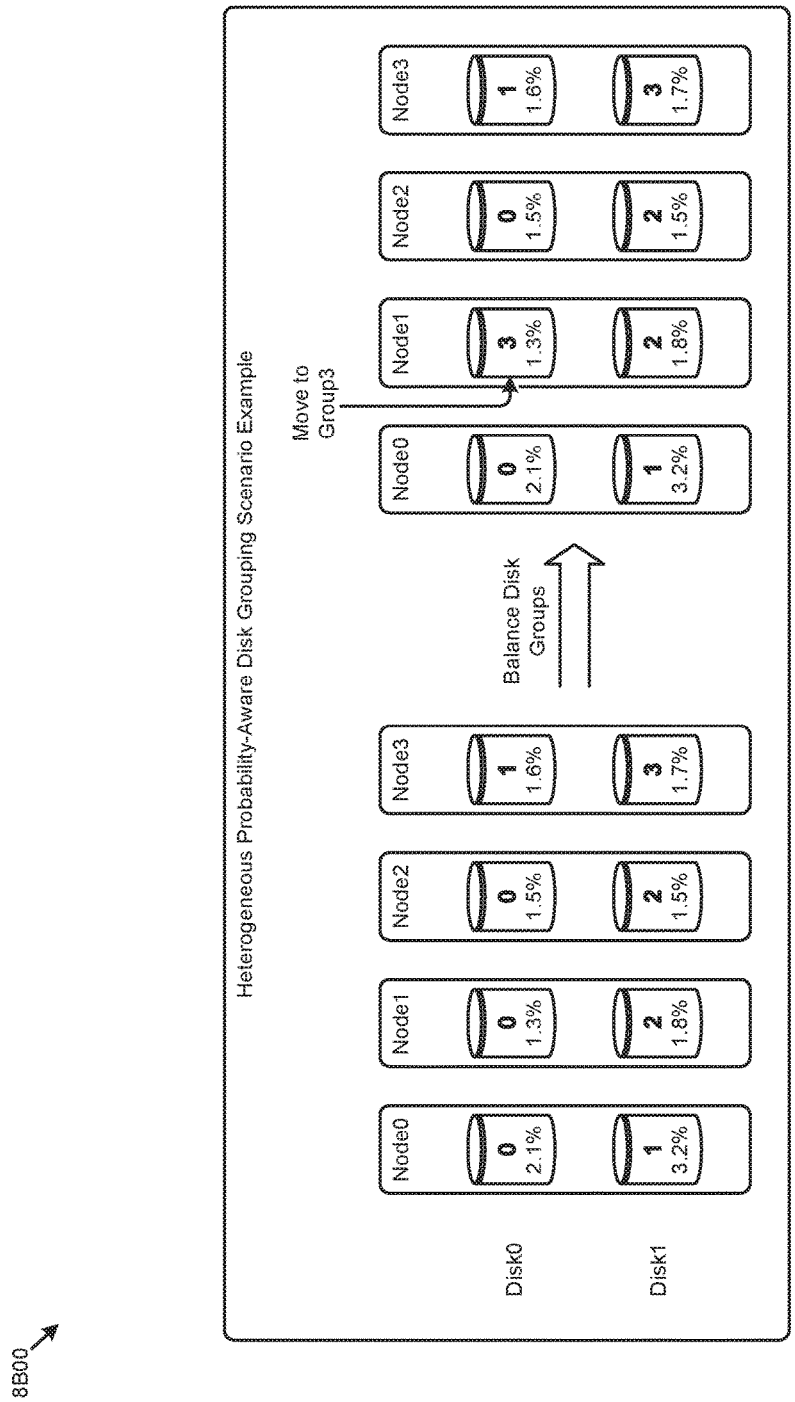
FIG. 8B presents a heterogeneous disk grouping scenario as implemented in systems that facilitate cluster-wide data loss protection while allowing for computing cluster expansion, according to an embodiment.

FIG. 8B presents a heterogeneous disk grouping scenario 8B00 as implemented in systems that facilitate cluster-wide data loss protection while allowing for computing cluster expansion. As an option, one or more variations of heterogeneous disk grouping scenario 8B00 or any aspect thereof may be implemented in the context of the architecture and functionality of the embodiments described herein. The heterogeneous disk grouping scenario 8B00 or any aspect thereof may be implemented in any environment.

The heterogeneous disk grouping scenario 8B00 shown in FIG. 8B is merely one example implementation of the heterogeneous disk grouping technique 8A00 shown and described as pertains to FIG. 8A. As can be observed, the heterogeneous disk grouping scenario 8B00 considers four subject nodes (e.g., node0, node1, node2, and node3) that each have two subject disks (e.g., disk0 and disk1). Further, heterogeneous disk grouping scenario 8B00 considers a maximum data loss probability of 5% (e.g., $P_{loss-max}$=5.0%). The disk-specific failure rates for the subject disks are also shown in FIG. 8B. Implementing the subject disk assignment portion of the heterogeneous disk grouping technique 8A00 in this environment results in the disk groups as illustrated with group identifiers. Applying the balancing operation (step 820 of FIG. 8A) of the heterogeneous disk grouping technique 8A00 results in a re-assignment of disk0 of node1 from group0 to group3.

Figure 9:
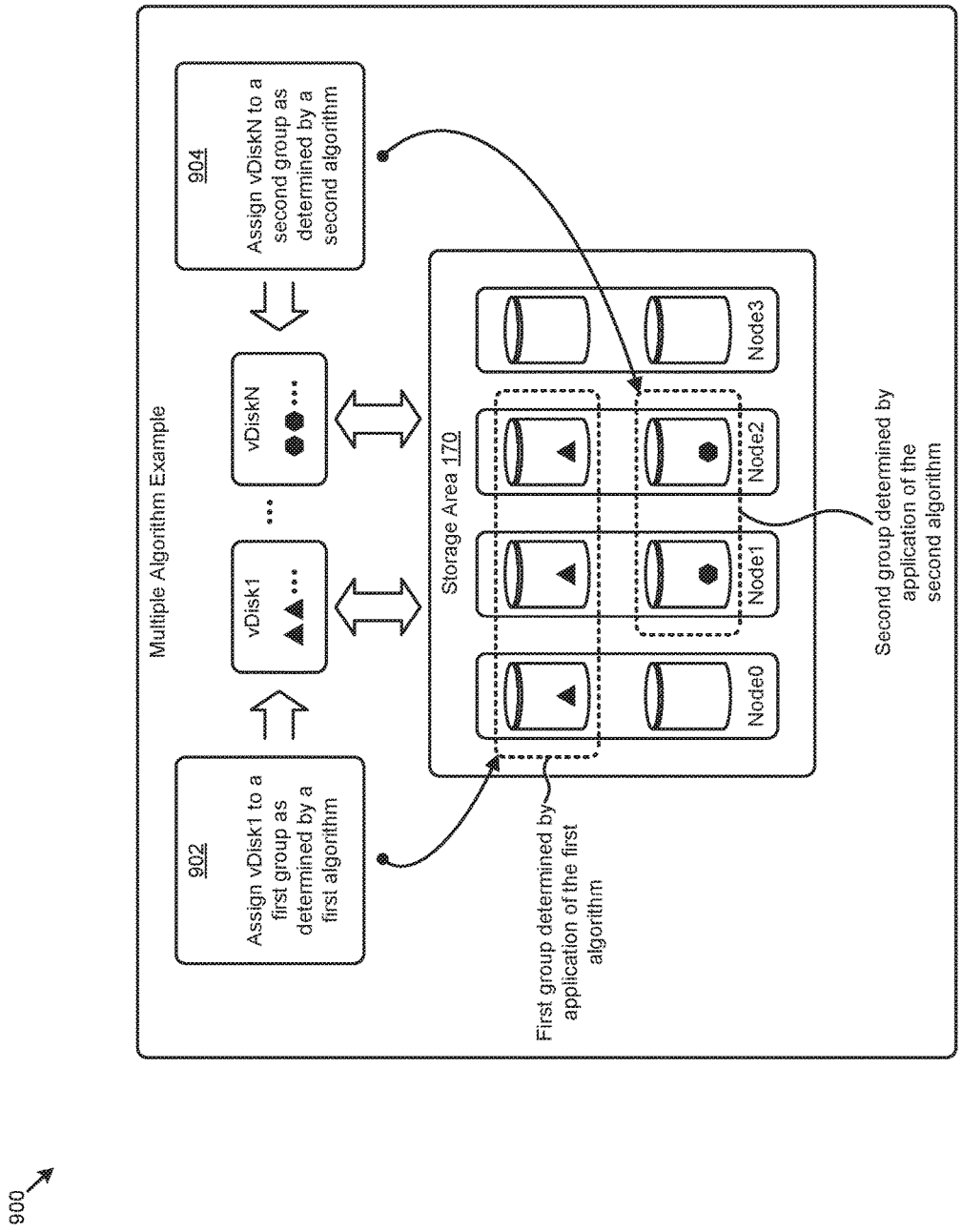
FIG. 9 presents a disk grouping technique as implemented in systems that facilitate cluster-wide data loss protection while allowing for computing cluster expansion, according to an embodiment.

In some cases, multiple techniques and/or algorithms can be applied to a particular set of nodes and/or disks as shown and described as pertains to FIG. 9.

FIG. 9 presents a disk grouping technique 900 as implemented in systems that facilitate cluster-wide data loss protection while allowing for computing cluster expansion. As an option, one or more variations of disk grouping technique 900 or any aspect thereof may be implemented in the context of the architecture and functionality of the embodiments described herein. The disk grouping technique 900 or any aspect thereof may be implemented in any environment.

FIG. 9 depicts a portion of the storage area 170 comprising four nodes (e.g., node0, node1, node2, and node3) that each have two disks. Various algorithms that codify the herein disclosed techniques can be implemented to form groups. Furthermore, any known techniques can be used to assign the datasets and their replicas (e.g., vDisk1, . . . , vDiskN) to groups of devices in the storage area 170. In some cases, multiple algorithms can be applied to a single storage area so as to form the groups, and then to assign the datasets to the groups. For example, a first algorithm might be selected based at least in part on a first storage I/O pattern, and a second algorithm might be selected based at least in part on a second storage I/O pattern. More specifically, and as shown, vDisk1 might be assigned to a first group as determined by a first algorithm (operation 902), and vDiskN might be assigned to a second group as determined by a second algorithm (operation 904).

Situations involving use of two or more different storage device grouping algorithms arise when, for example, the cluster hosts both a storage-centric node with a very large number of drives that are used under only light or low frequency storage I/O patterns as well as a series of compute-centric nodes, each of which compute-centric nodes have high frequency storage I/O patterns. In a cluster with such a configuration, two or more different algorithms can be used.

There exist still other situations, for example when a first set of storage devices of a first type such as solid state drives (SSDs) and a second set of storage devices of a second type such as hard disk drives (HDDs) are distributed throughout the cluster. In such a case, multiple storage device grouping algorithms might be employed. More specifically, since the failure rates of SSDs do not vary substantially as a function of vibration, a first grouping algorithm that does not take vibration into account might be applied to the SSDs. Also, even in the same cluster, since failure rates of HDDs do vary as a function of vibration, a second grouping algorithm that does take vibration into account might be applied to the HDDs.

Even further situations for applying one or more grouping algorithms can arise based at least in part on the topology of the cluster and/or based at least in part on characteristics of its environment. An example of a clustered computing environment is presented and discussed as pertains to FIG. 10.

Figure 10:
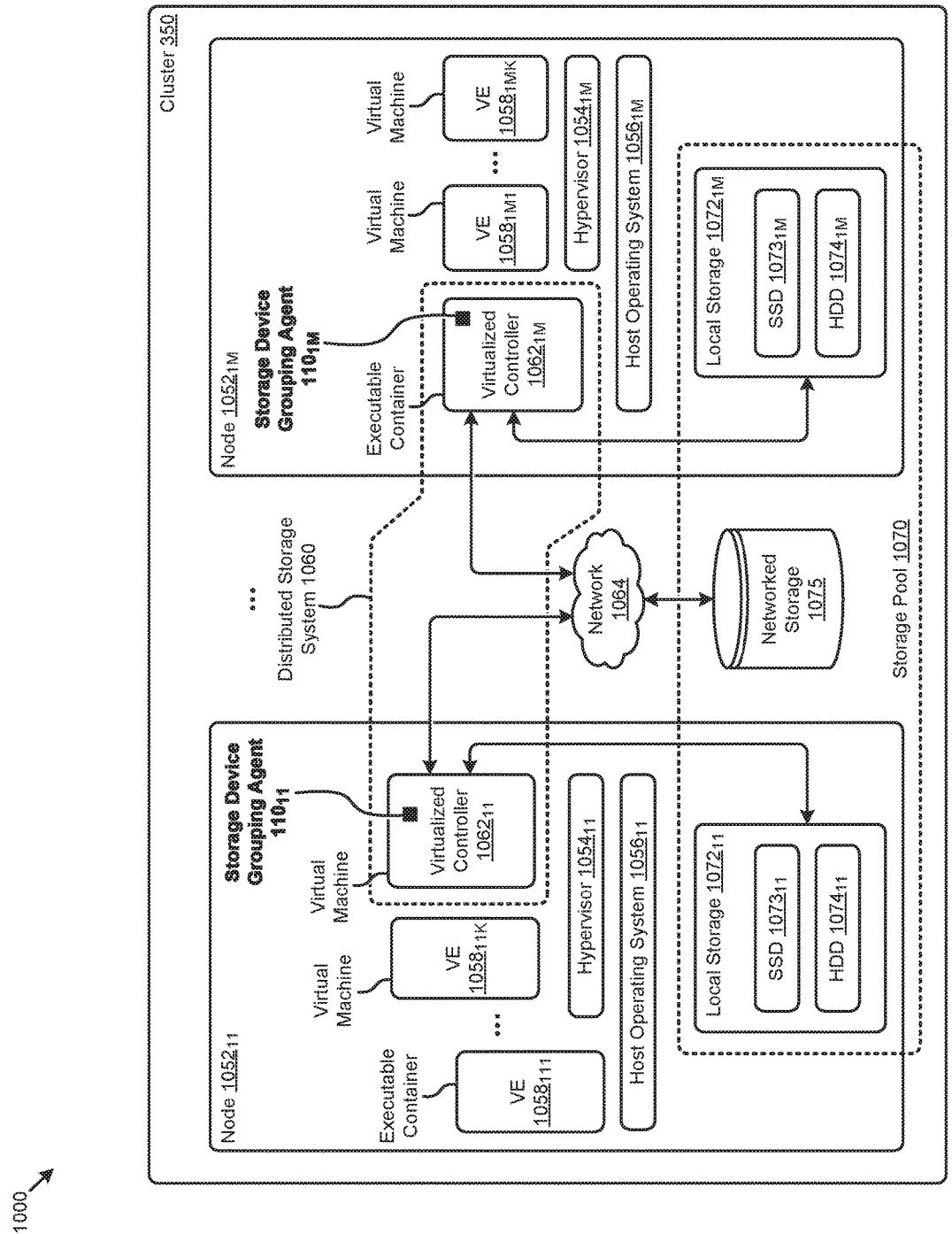
FIG. 10 presents a clustered computing environment in which embodiments of the present disclosure can operate.

FIG. 10 presents a clustered computing environment 1000 in which embodiments of the present disclosure can operate. The embodiment shown in FIG. 10 is merely one example. The shown clustered computing environment depicts various components associated with one instance of a clustered virtualization system (e.g., hyperconverged distributed system) comprising a distributed storage system 1060 that can be used to implement the herein disclosed techniques.

Specifically, the shown clustered computing environment 1000 includes cluster 350 that comprises multiple nodes that have multiple tiers of storage in a storage pool. Representative nodes (e.g., node $1052_{11}$, . . . , node $1052_{1M}$) and storage pool 1070 associated with cluster 350 are shown.

Each node can be associated with one server, multiple servers, or portions of a server. The nodes can be associated (e.g., logically and/or physically) with the clusters. As shown, the multiple tiers of storage include storage that is accessible through a network 1064, such as a networked storage 1075 (e.g., a storage area network or SAN, network attached storage or NAS, etc.). The multiple tiers of storage further include instances of local storage (e.g., local storage $1072_{11}$, . . . , local storage $1072_{1M}$). For example, the local storage can be within or directly attached to a server and/or appliance associated with the nodes. Such local storage can include solid state drives (SSD $1073_{11}$, . . . , SSD $1073_{1M}$), hard disk drives (HDD $1074_{11}$, . . . , HDD $1074_{1M}$), and/or other storage devices.

As shown, the nodes in clustered computing environment 1000 can implement one or more user virtualized entities (e.g., VE $1058_{111}$, . . . , VE $1058_{11K}$, . . . , VE $1058_{1M1}$, . . . , VE $1058_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $1056_{11}$, . . . , host operating system $1056_{1M}$), while the VMs run multiple applications on various respective guest operating systems. Such flexibility can be facilitated at least in part by a hypervisor (e.g., hypervisor $1054_{11}$, . . . , hypervisor $1054_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $1056_{11}$, . . . , host operating system $1056_{1M}$) without, in most cases, a hypervisor layer. This lightweight implementation can facilitate efficient distribution of certain software components, such as applications or services (e.g., micro-services). As shown, clustered computing environment 1000 can implement both a hypervisor-assisted virtualization environment and a container virtualization environment for various purposes.

Clustered computing environment 1000 also comprises at least one instance of a virtualized controller to facilitate access to storage pool 1070 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 1060 which can, among other operations, manage the storage pool 1070. This architecture further facilitates efficient scaling of the virtualization system. The foregoing virtualized controllers can be implemented in clustered computing environment 1000 using various techniques. Specifically, an instance of a virtual machine at a given node can be used as a virtualized controller in a hypervisor-assisted virtualization environment to manage storage and I/O activities. In this case, for example, the virtualized entities at node $1052_{11}$ can interface with a controller virtual machine (e.g., virtualized controller $1062_{11}$) through hypervisor $1054_{11}$ to access the storage pool 1070. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 1060.

For example, a hypervisor at one node in the distributed storage system 1060 might correspond to VMware ESXi software, and a hypervisor at another node in the distributed storage system 1060 might correspond to Nutanix AHV software. As another virtualized controller implementation example, containers (e.g., Docker containers) can be used to implement a virtualized controller (e.g., virtualized controller $1062_{1M}$) in an operating system virtualization environment at a given node. In this case, for example, the virtualized entities at node $1052_{1M}$ can access the storage pool 1070 by interfacing with a controller container (e.g., virtualized controller $1062_{1M}$) through hypervisor $1054_{1M}$ and/or the kernel of host operating system $1056_{1M}$.

In certain embodiments, one or more instances of a storage device grouping agent can be implemented in the distributed storage system 1060 to facilitate the herein disclosed techniques. Specifically, storage device grouping agent $110_{11}$ can be implemented in the virtualized controller $1062_{11}$, and storage device grouping agent $110_{1M}$ can be implemented in the virtualized controller $1062_{1M}$. Such instances of the virtualized controller and/or its agents (e.g., all or a portion of a storage device grouping agent) can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., storage device grouping agent). In some cases, a virtualized controller in a cluster is selected (e.g., elected as leader) to serve as an access point for the cluster. In such cases, the instance of the storage device grouping agent associated with the selected virtualized controller might be activated while other instances of the storage device grouping agent in the cluster might be deactivated. When the activated storage device grouping agent has determined the storage device groups for the cluster and assigned the datasets (e.g., virtual disks of the VEs) to the storage device groups, the groupings and dataset assignments are broadcast to the other virtualized controllers in the cluster. These virtualized controllers can process storage I/O from the VEs in accordance with the groupings and assignments.

ADDITIONAL EMBODIMENTS OF THE DISCLOSURE

Additional Practical Application Examples

Figure 11A:
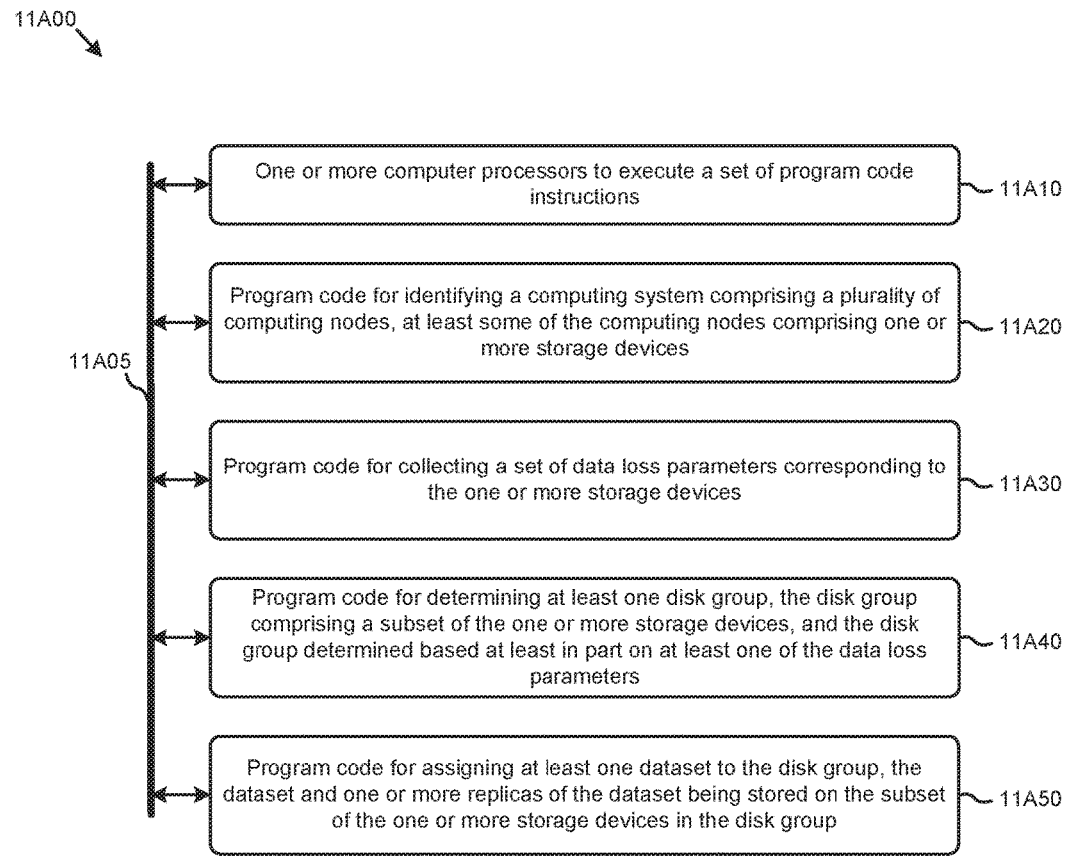
FIG. 11A, FIG. 11B, and FIG. 11C depict system components as arrangements of computing modules that are interconnected so as to implement certain of the herein-disclosed embodiments.

FIG. 11A depicts a system 11A00 as an arrangement of computing modules that are interconnected so as to operate cooperatively to implement certain of the herein-disclosed embodiments. This and other embodiments present particular arrangements of elements that, individually and/or as combined, serve to form improved technological processes that address maximizing the number of nodes in a cluster while maintaining an acceptable likelihood of data loss. The partitioning of system 11A00 is merely illustrative and other partitions are possible. As an option, the system 11A00 may be implemented in the context of the architecture and functionality of the embodiments described herein. Of course, however, the system 11A00 or any operation therein may be carried out in any desired environment. The system 11A00 comprises at least one processor and at least one memory, the memory serving to store program instructions corresponding to the operations of the system. As shown, an operation can be implemented in whole or in part using program instructions accessible by a module. The modules are connected to a communication path 11A05, and any operation can communicate with other operations over communication path 11A05. The modules of the system can, individually or in combination, perform method operations within system 11A00. Any operations performed within system 11A00 may be performed in any order unless as may be specified in the claims. The shown embodiment implements a portion of a computer system, presented as system 11A00, comprising one or more computer processors to execute a set of program code instructions (module 11A10) and modules for accessing memory to hold program code instructions to perform: identifying a computing system comprising a plurality of computing nodes, at least some of the computing nodes comprising one or more storage devices (module 11A20); collecting a set of data loss parameters corresponding to the one or more storage devices (module 11A30); determining at least one disk group, the disk group comprising a subset of the one or more storage devices, and the disk group determined based at least in part on at least one of the data loss parameters (module 11A40); and assigning at least one dataset to the disk group, the dataset and one or more replicas of the dataset being stored on the subset of the one or more storage devices in the disk group (module 11A50).

Variations of the foregoing may include more or fewer of the shown modules. Certain variations may perform more or fewer (or different) steps, and/or certain variations may use data elements in more, or in fewer (or different) operations.

Figure 11B:
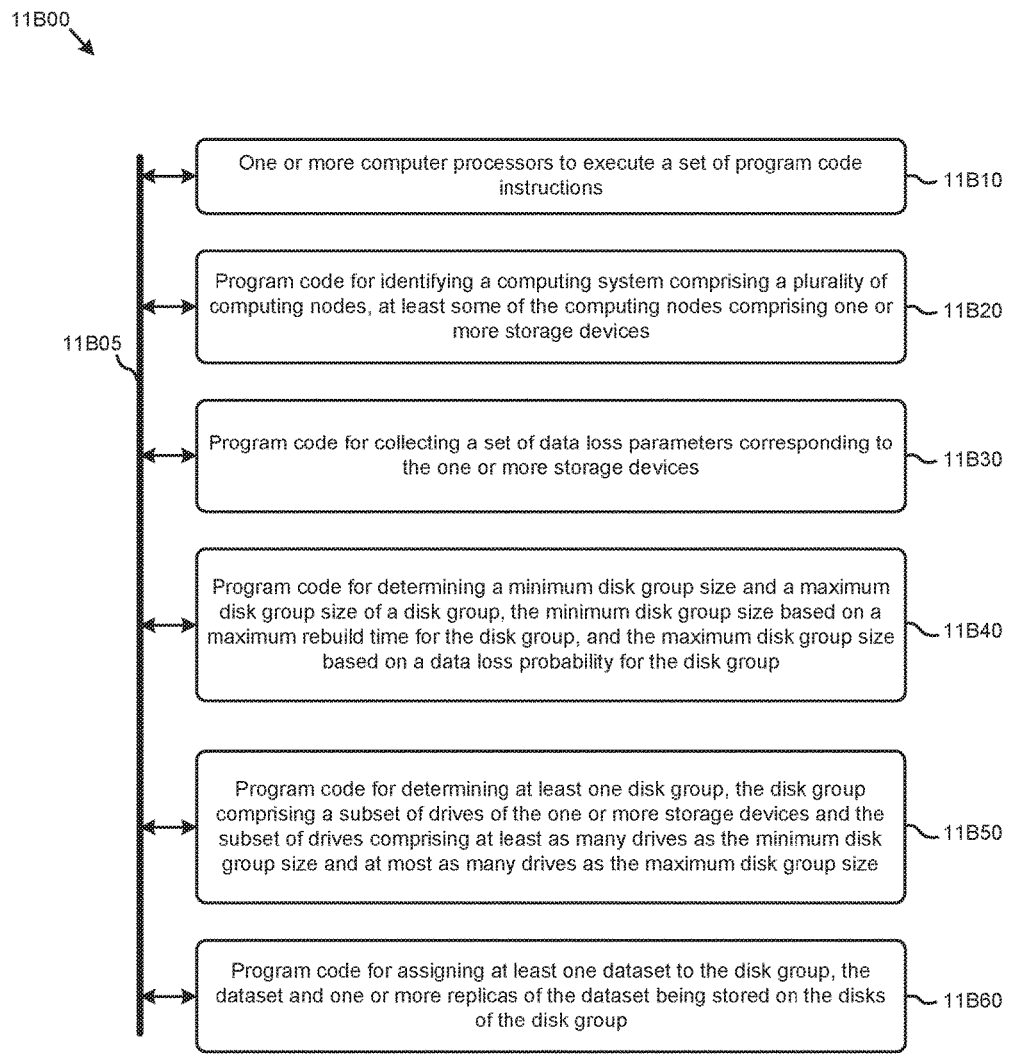

FIG. 11B depicts a system 11B00 as an arrangement of computing modules that are interconnected so as to operate cooperatively to implement certain of the herein-disclosed embodiments. The partitioning of system 11B00 is merely illustrative and other partitions are possible. As an option, the system 11B00 may be implemented in the context of the architecture and functionality of the embodiments described herein. Of course, however, the system 11B00 or any operation therein may be carried out in any desired environment.

The system 11B00 comprises at least one processor and at least one memory, the memory serving to store program instructions corresponding to the operations of the system. As shown, an operation can be implemented in whole or in part using program instructions accessible by a module. The modules are connected to a communication path 11B05, and any operation can communicate with other operations over communication path 11B05. The modules of the system can, individually or in combination, perform method operations within system 11B00. Any operations performed within system 11B00 may be performed in any order unless as may be specified in the claims.

The shown embodiment implements a portion of a computer system, presented as system 11B00, comprising one or more computer processors to execute a set of program code instructions (module 11B10) and modules for accessing memory to hold program code instructions to perform: identifying a computing system comprising a plurality of computing nodes, at least some of the computing nodes comprising one or more storage devices (module 11B20); collecting a set of data loss parameters corresponding to the one or more storage devices (module 11B30); determining a minimum disk group size and a maximum disk group size of a disk group, the minimum disk group size based on a maximum rebuild time for the disk group, and the maximum disk group size based on a data loss probability for the disk group (module 11B40); determining at least one disk group, the disk group comprising a subset of drives of the one or more storage devices and the subset of drives comprising at least as many drives as the minimum disk group size and at most as many drives as the maximum disk group size (module 11B50); and assigning at least one dataset to the disk group, the dataset and one or more replicas of the dataset being stored on the disks of the disk group (module 11B60).

Figure 11C:
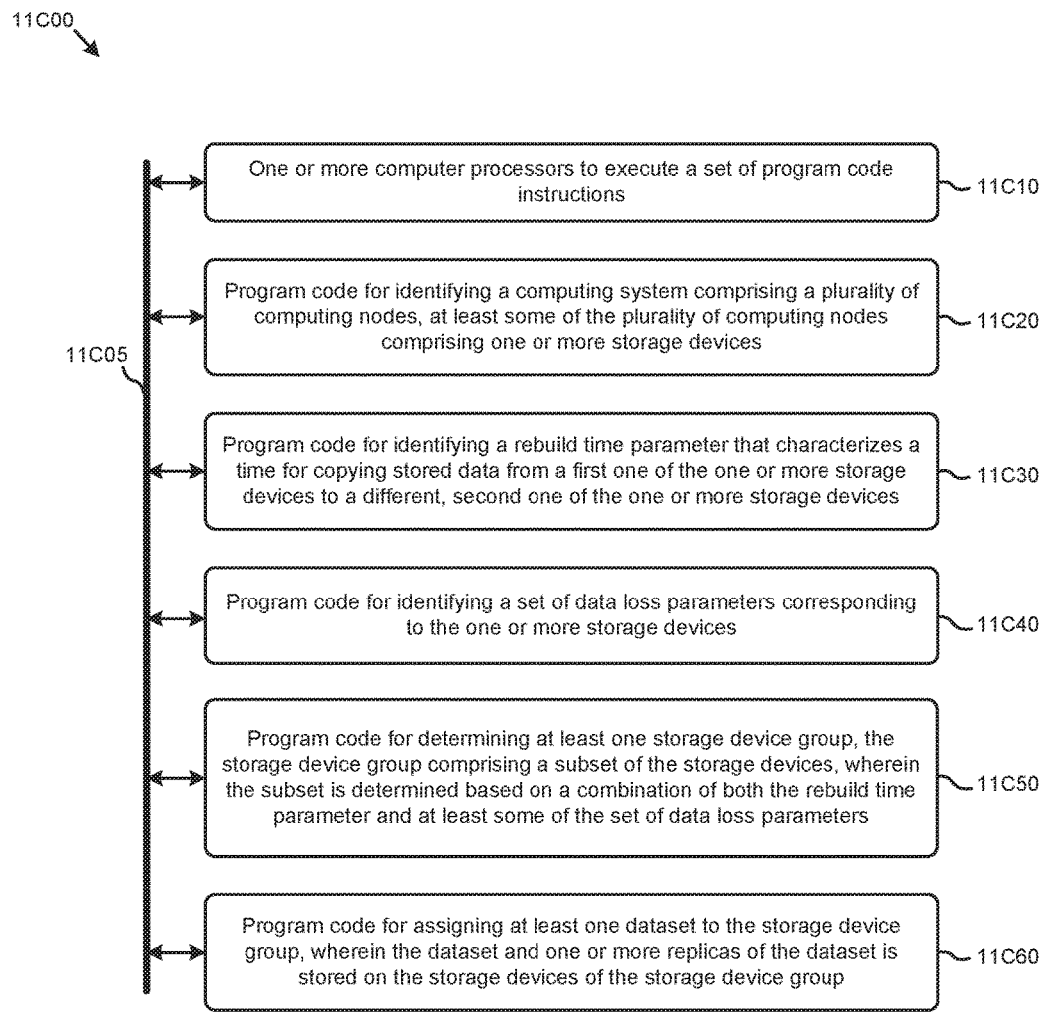

FIG. 11C depicts a system 11C00 as an arrangement of computing modules that are interconnected so as to operate cooperatively to implement certain of the herein-disclosed embodiments. The partitioning of system 11C00 is merely illustrative and other partitions are possible. As an option, the system 11C00 may be implemented in the context of the architecture and functionality of the embodiments described herein. Of course, however, the system 11C00 or any operation therein may be carried out in any desired environment. The system 11C00 comprises at least one processor and at least one memory, the memory serving to store program instructions corresponding to the operations of the system. As shown, an operation can be implemented in whole or in part using program instructions accessible by a module. The modules are connected to a communication path 11C05, and any operation can communicate with other operations over communication path 11C05. The modules of the system can, individually or in combination, perform method operations within system 11C00. Any operations performed within system 11C00 may be performed in any order unless as may be specified in the claims. The shown embodiment implements a portion of a computer system, presented as system 11C00, comprising one or more computer processors to execute a set of program code instructions (module 11C10) and modules for accessing memory to hold program code instructions to perform: identifying a computing system comprising a plurality of computing nodes, at least some of the plurality of computing nodes comprising one or more storage devices (module 11C20); identifying a rebuild time parameter that characterizes a time for copying stored data from a first one of the one or more storage devices to a different, second one of the one or more storage devices (module 11C30); identifying a set of data loss parameters corresponding to the one or more storage devices (module 11C40); determining at least one storage device group, the storage device group comprising a subset of the storage devices, wherein the subset is determined based on a combination of both the rebuild time parameter and at least some of the set of data loss parameters (module 11C50); and assigning at least one dataset to the storage device group, wherein the dataset and one or more replicas of the dataset is stored on the storage devices of the storage device group (module 11C60).

SYSTEM ARCHITECTURE OVERVIEW

Additional System Architecture Examples

Figure 12A:
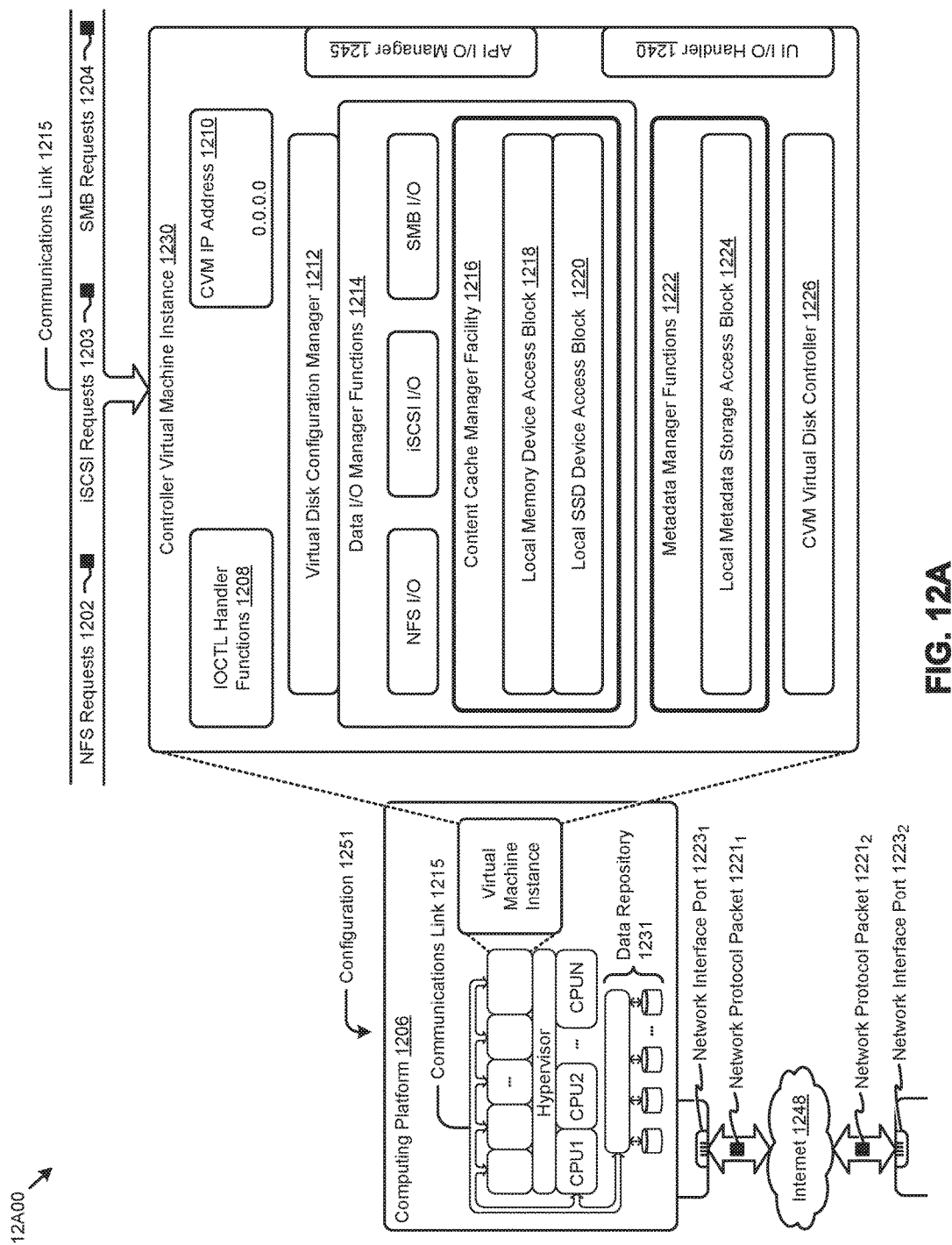
FIG. 12A, FIG. 12B, and FIG. 12C depict virtualized controller architectures comprising collections of interconnected components suitable for implementing embodiments of the present disclosure and/or for use in the herein-described environments.

FIG. 12A depicts a virtualized controller as implemented by the shown virtual machine architecture 12A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 12A00 comprises a collection of interconnected components suitable for implementing embodiments of the present disclosure and/or for use in the herein-described environments. Moreover, virtual machine architecture 12A00 includes a virtual machine instance in configuration 1251 that is further described as pertaining to controller virtual machine instance 1230. Configuration 1251 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1230.

In this and other configurations, a controller virtual machine instance receives block I/O (input/output or IO) storage requests as network file system (NFS) requests in the form of NFS requests 1202, and/or internet small computer storage interface (iSCSI) block IO requests in the form of iSCSI requests 1203, and/or Samba file system (SMB) requests in the form of SMB requests 1204. The controller virtual machine (CVM) instance publishes and responds to an internet protocol (IP) address (e.g., CVM IP address 1210). Various forms of input and output (I/O or IO) can be handled by one or more IO control handler functions (e.g., IOCTL handler functions 1208) that interface to other functions such as data IO manager functions 1214 and/or metadata manager functions 1222. As shown, the data IO manager functions can include communication with virtual disk configuration manager 1212 and/or can include direct or indirect communication with any of various block IO functions (e.g., NFS IO, iSCSI IO, SMB IO, etc.).

In addition to block IO functions, configuration 1251 supports IO of any form (e.g., block IO, streaming IO, packet-based IO, HTTP traffic, etc.) through either or both of a user interface (UI) handler such as UI IO handler 1240 and/or through any of a range of application programming interfaces (APIs), possibly through API IO manager 1245.

Communications link 1215 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 1230 includes content cache manager facility 1216 that accesses storage locations, possibly including local dynamic random access memory (DRAM) (e.g., through the local memory device access block 1218) and/or possibly including accesses to local solid state storage (e.g., through local SSD device access block 1220).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1231, which in turn can be formatted into any one or more storage areas, and which can comprise parameterized storage accessible by a key (e.g., a filename, a table name, a block address, an offset address, etc.). External data repository 1231 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 1224. External data repository 1231 can be configured using CVM virtual disk controller 1226, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1251 can be coupled by communications link 1215 (e.g., backplane, LAN, PSTN, wired or wireless network, etc.) and each instance may perform respective portions of sequences of instructions as may be required to practice embodiments of the disclosure.

The shown computing platform 1206 is interconnected to the Internet 1248 through one or more network interface ports (e.g., network interface port 12231 and network interface port 12232). Configuration 1251 can be addressed through one or more network interface ports using an IP address. Any operational element within computing platform 1206 can perform sending and receiving operations using any of a range of network protocols, possibly including network protocols that send and receive packets (e.g., network protocol packet 12211 and network protocol packet 12212).

Computing platform 1206 may transmit and receive messages that can be composed of configuration data and/or any other forms of data and/or instructions organized into a data structure (e.g., communications packets). In some cases, the data structure includes program code instructions (e.g., application code) communicated through the Internet 1248 and/or through any one or more instances of communications link 1215. Received program code may be processed and/or executed by a CPU as it is received and/or program code may be stored in any volatile or non-volatile storage for later execution. Program code can be transmitted via an upload (e.g., an upload from an access device over the Internet 1248 to computing platform 1206). Further, program code and/or the results of executing program code can be delivered to a particular user via a download (e.g., a download from computing platform 1206 over the Internet 1248 to an access device).

Configuration 1251 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to achieving cluster-wide data loss protection while achieving acceptable data restoration performance in large-scale distributed computing clusters. In some embodiments, a module may include one or more state machines and/or combinational logic used to implement or facilitate the operational and/or performance characteristics pertaining to achieving cluster-wide data loss protection while achieving acceptable data restoration performance in large-scale distributed computing clusters.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of achieving cluster-wide data loss protection while achieving acceptable data restoration performance in large-scale distributed computing clusters). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when and manipulated when performing computerized operations pertaining to implementing a multi-objective grouping technique to form groups of storage devices in a cluster that store respective datasets and their replicas to achieve data consistency objectives in large clusters.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 12B:
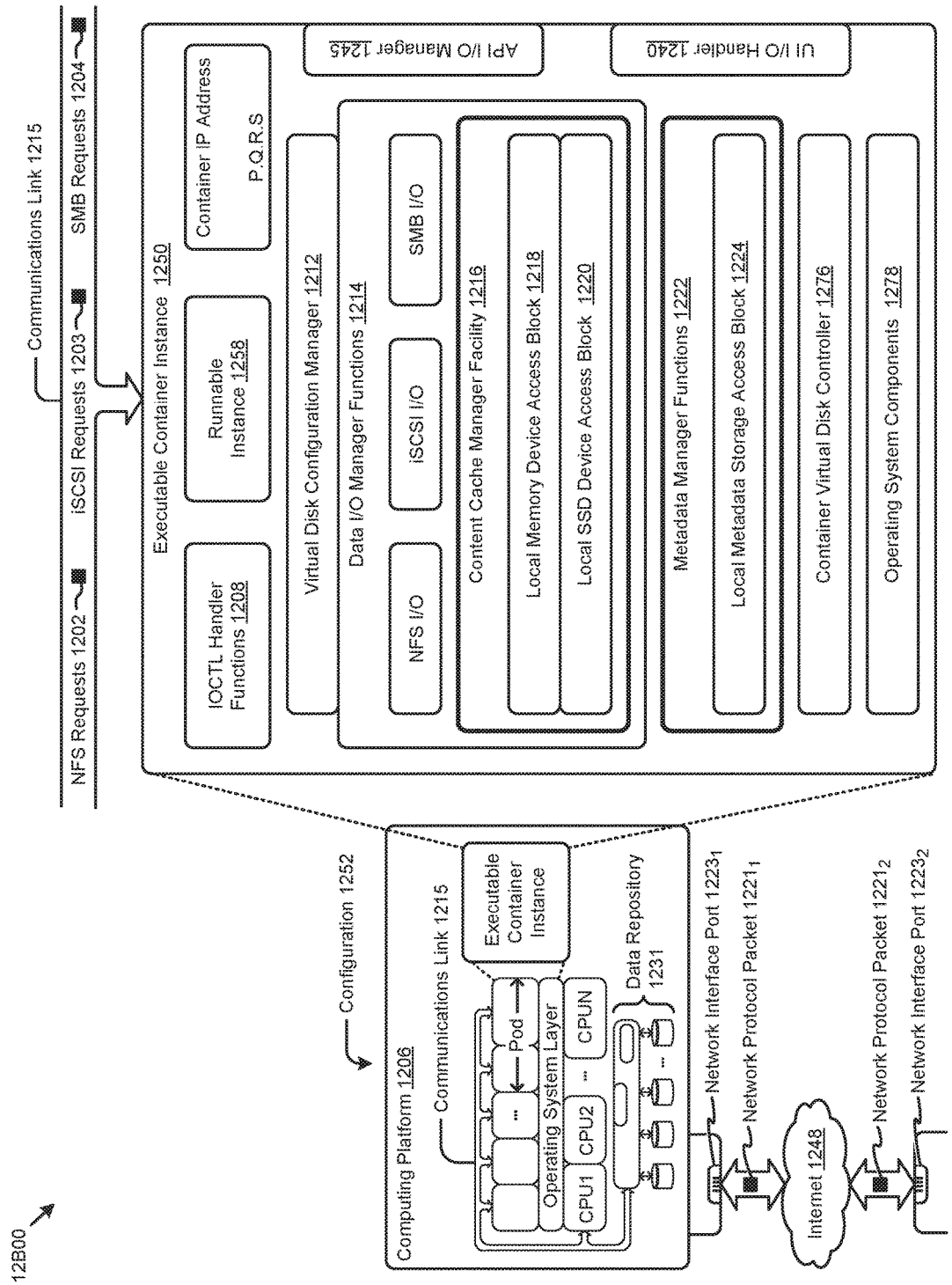

FIG. 12B depicts a virtualized controller implemented by containerized architecture 12B00. The containerized architecture comprises a collection of interconnected components suitable for implementing embodiments of the present disclosure and/or for use in the herein-described environments. Moreover, the shown containerized architecture 12B00 includes an executable container instance in configuration 1252 that is further described as pertaining to the executable container instance 1250. Configuration 1252 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1250). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 1278, however such a separate set of operating system components need not be provided. As an alternative, an executable container can include runnable instance 1258, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1276. Such a container virtual disk controller can perform any of the functions that the aforementioned CVM virtual disk controller 1226 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 12C:
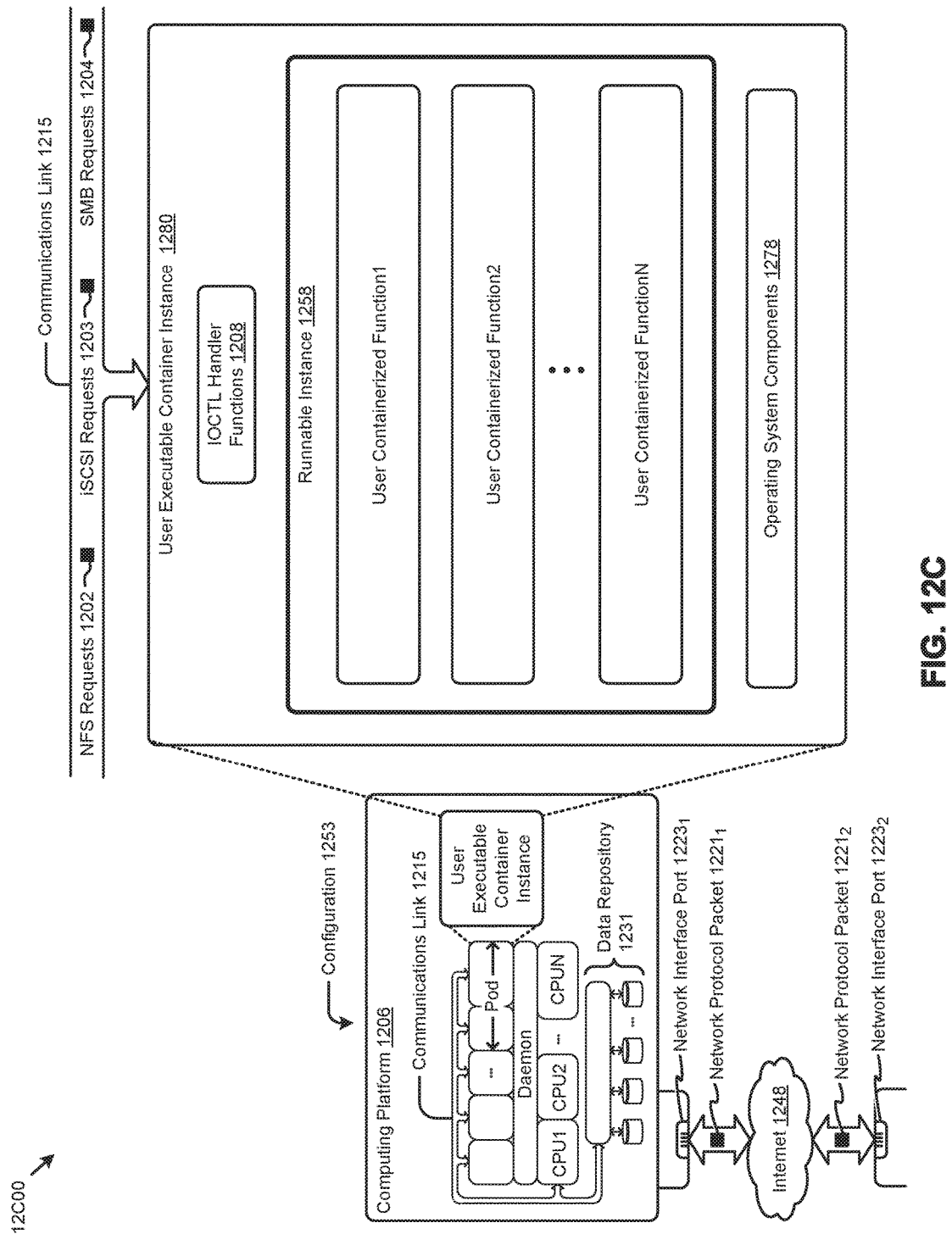

FIG. 12C depicts a virtualized controller implemented by a daemon-assisted containerized architecture 12C00. The containerized architecture comprises a collection of interconnected components suitable for implementing embodiments of the present disclosure and/or for use in the herein-described environments. Moreover, the shown instance of daemon-assisted containerized architecture 12C00 includes a user executable container instance in configuration 1253 that is further described as pertaining to user executable container instance 1280. Configuration 1253 includes a daemon layer (as shown) that performs certain functions of an operating system.

User executable container instance 1280 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 1258). In some cases, the shown operating system components 1278 comprise portions of an operating system, which portions are interfaced with or included in the runnable instance and/or any user containerized functions. In this embodiment of a daemon-assisted containerized architecture, the computing platform 1206 might or might not host operating system components other than operating system components 1278. More specifically, the shown daemon might or might not host operating system components other than operating system components 1278 of user executable container instance 1280.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   determining a rebuild time parameter that characterizes a time for copying stored data from a first storage device to a second storage device of a computing system, the computing system comprising a plurality of computing nodes;
   determining a data loss parameter corresponding to a storage device of a computing node of the plurality of computing nodes;
   determining a storage device group having a maximum number of storage devices selected from storage devices of the plurality of computing nodes by:
      identifying a maximum data loss probability value determined based at least in part on the rebuild parameter and a data loss parameter corresponding to the storage device,
      incrementally adding the storage device to the storage device group, and
      comparing an estimated data loss probability value of the storage device group having the storage device added against the maximum data loss probability value, wherein the maximum number of storage devices for the storage device group is determined when the estimated data loss probability value exceeds the maximum data loss probability value; and
   assigning a dataset to the storage device group, wherein the dataset and a replica of the dataset are stored in the storage device group.

2. The method of claim 1, wherein the rebuild time parameter is based at least in part on a value of a service level agreement.

3. The method of claim 1, wherein the rebuild time parameter is based at least in part on a data throughput of the storage device.

4. The method of claim 1, further comprising implementing a code base that comprises a storage device grouping algorithm, wherein the storage device grouping algorithm is invoked to determine the storage device group.

5. The method of claim 4, wherein the storage device grouping algorithm is invoked based at least in part on a value of the data loss parameter.

6. The method of claim 5, wherein the value of the data loss parameter quantifies at least one of, a maximum data loss probability, a maximum storage device group size, a quantity of computing nodes, a quantity of storage devices, a failure rebuild time, or a drive failure rate.

7. The method of claim 6, wherein the drive failure rate corresponds to a respective storage device.

8. The method of claim 6, wherein the drive failure rate is derived from at least one of, a temperature measurement, or a slot-specific vibration measurement, or a location-specific vibration measurement, or a slot-specific temperature measurement, or a location-specific temperature measurement.

9. The method of claim 1, wherein the storage device group comprises a first storage device from a first computing node and a second storage device from a second computing node.

10. The method of claim 1, wherein the maximum number of storage devices is determined by reducing the maximum number of storage devices by 1 when the estimated data loss probability value exceeds the maximum data loss probability value.

11. The method of claim 1, wherein the storage device group comprises a first storage device of a first computing node and a second storage device of a randomly-identified second node.

12. The method of claim 1, wherein the storage device group comprises a first storage device of a first computing node and a second storage device of a second computing node, and wherein the storage device group is determined based at least in part on a first failure rate of the first storage device and a second failure rate of the second storage device.

13. The method of claim 1, wherein determining a first storage device group is based at least in part on a first data loss parameter, and wherein determining a second storage device group is based at least in part on a second data loss parameter.

14. The method of claim 13, wherein a first storage device grouping algorithm operates over the first data loss parameter and wherein a second storage device grouping algorithm operates over the second data loss parameter.

15. The method of claim 1, wherein the computing system is a cluster of computing nodes.

16. The method of claim 1, wherein the dataset corresponds to a virtual disk.

17. A computer readable medium, embodied in a non-transitory computer readable medium, the non-transitory computer readable medium having stored thereon a sequence of instructions which, when stored in memory and executed by one or more processors causes the one or more processors to perform a set of acts, the acts comprising:
   determining a rebuild time parameter that characterizes a time for copying stored data from a first storage device to a second storage device of a computing system, the computing system comprising a plurality of computing nodes;
   determining a data loss parameter corresponding to a storage device of a computing node of the plurality of computing nodes;
   determining a storage device group having a maximum number of storage devices selected from storage devices of the plurality of computing nodes by:
      identifying a maximum data loss probability value determined based at least in part on the rebuild parameter and a data loss parameter corresponding to the storage device,
      incrementally adding the storage device to the storage device group, and
      comparing an estimated data loss probability value of the storage device group having the storage device added against the maximum data loss probability value, wherein the maximum number of storage devices for the storage device group is determined when the estimated data loss probability value exceeds the maximum data loss probability value; and
   assigning a dataset to the storage device group, wherein the dataset and a replica of the dataset are stored in the storage device group.

18. The computer readable medium of claim 17, wherein the maximum number of storage devices is determined by reducing the maximum number of storage devices by 1 when the estimated data loss probability value exceeds the maximum data loss probability value.

19. A system comprising:
a storage medium having stored thereon a sequence of instructions; and
one or more processors that execute the instructions to cause the one or more processors to perform a set of acts, the acts comprising,
   determining a rebuild time parameter that characterizes a time for copying stored data from a first storage device to a second storage device of a computing system, the computing system comprising a plurality of computing nodes;
   determining a data loss parameter corresponding to a storage device of a computing node of the plurality of computing nodes;
   determining a storage device group having a maximum number of storage devices selected from storage devices of the plurality of computing nodes by:
      identifying a maximum data loss probability value determined based at least in part on the rebuild parameter and a data loss parameter corresponding to the storage device,
      incrementally adding the storage device to the storage device group, and
      comparing an estimated data loss probability value of the storage device group having the storage device added against the maximum data loss probability value, wherein the maximum number of storage devices for the storage device group is determined when the estimated data loss probability value exceeds the maximum data loss probability value; and
   assigning a dataset to the storage device group, wherein the dataset and a replica of the dataset are stored in the storage device group.

20. The system of claim 19, wherein the maximum number of storage devices is determined by reducing the maximum number of storage devices by 1 when the estimated data loss probability value exceeds the maximum data loss probability value.

* * * * *